United States Patent
Miyamoto et al.

(10) Patent No.: US 11,297,378 B2
(45) Date of Patent: Apr. 5, 2022

(54) IMAGE ARRANGEMENT DETERMINATION APPARATUS, DISPLAY CONTROLLING APPARATUS, IMAGE ARRANGEMENT DETERMINATION METHOD, DISPLAY CONTROLLING METHOD, AND PROGRAM

(71) Applicant: SONY INTERACTIVE ENTERTAINMENT INC., Tokyo (JP)

(72) Inventors: Masayuki Miyamoto, Tokyo (JP); Yasunori Matsui, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 49 days.

(21) Appl. No.: 16/621,934

(22) PCT Filed: Jun. 22, 2018

(86) PCT No.: PCT/JP2018/023771
§ 371 (c)(1),
(2) Date: Dec. 12, 2019

(87) PCT Pub. No.: WO2019/004073
PCT Pub. Date: Jan. 3, 2019

(65) Prior Publication Data
US 2021/0160561 A1 May 27, 2021

(30) Foreign Application Priority Data
Jun. 28, 2017 (JP) .............................. JP2017-126477

(51) Int. Cl.
*H04N 21/435* (2011.01)
*H04N 13/178* (2018.01)
(Continued)

(52) U.S. Cl.
CPC ......... *H04N 21/435* (2013.01); *G02B 27/017* (2013.01); *H04N 13/161* (2018.05); *H04N 13/178* (2018.05); *H04N 21/234* (2013.01)

(58) Field of Classification Search
CPC ........... H04N 2013/0092; H04N 13/10; H04N 2213/002
See application file for complete search history.

(56) References Cited

U.S. PATENT DOCUMENTS

| | | | | |
|---|---|---|---|---|
| 5,500,683 A | * | 3/1996 | Yatomi | .............. H04N 5/44513 348/565 |
| 2009/0128620 A1 | * | 5/2009 | Lipton | ................. H04N 13/194 348/42 |
| 2012/0281068 A1 | * | 11/2012 | Celia | .................... H04N 13/161 348/43 |

FOREIGN PATENT DOCUMENTS

| | | |
|---|---|---|
| JP | 2000-308089 A | 11/2000 |
| JP | 2004363875 A | 12/2004 |

(Continued)

OTHER PUBLICATIONS

Notice of Reasons for Refusal dated Jul. 14, 2020, from Japanese Patent Application No. 2019-526858, 4 sheets.

(Continued)

*Primary Examiner* — Kent W Chang
*Assistant Examiner* — Chayce R Bibbee
(74) *Attorney, Agent, or Firm* — Katten Muchin Rosenman LLP

(57) ABSTRACT

An image arrangement determination apparatus, a display controlling apparatus, an image arrangement determination method, a display controlling method, and a program that can determine appropriate arrangement of an individual frame image with respect to a synthetic frame image according to a given standard are provided. A captured image acquisition section (60) acquires a plurality of images (Continued)

including a first image and a second image. A margin specification section (62) specifies a margin when the first image is arranged by a given first arrangement method in a region occupied by a third image that is a delivery target. An arrangement determination section (64) determines an arrangement method by which the second image is to be arranged in the margin as a second arrangement method based on a shape of the margin and a shape of the second image.

6 Claims, 19 Drawing Sheets

(51) Int. Cl.
*H04N 13/161* (2018.01)
*G02B 27/01* (2006.01)
*H04N 21/234* (2011.01)

(56) References Cited

FOREIGN PATENT DOCUMENTS

| JP | 2007-33946 A | 2/2007 |
|----|----|----|
| JP | 2007-104615 A | 4/2007 |
| JP | 2007-536825 A | 12/2007 |
| JP | 2011-109397 A | 6/2011 |
| JP | 2011-146930 A | 7/2011 |
| JP | 2012-099890 A | 5/2012 |
| JP | 2013-515389 A | 5/2013 |
| JP | 2013-172374 A | 9/2013 |
| JP | 2013-534782 A | 9/2013 |
| JP | 2018007198 A | 1/2018 |
| WO | 2005/112448 A2 | 11/2005 |
| WO | 2011/077343 A1 | 6/2011 |
| WO | 2012/001606 A1 | 1/2012 |
| WO | 2014/025294 A1 | 2/2014 |

OTHER PUBLICATIONS

International Preliminary Report on Patentability dated Jan. 9, 2020, from International Application No. PCT/JP2018/023771, 21 sheets.
Notification of Reasons for Refusal dated Jan. 26, 2021, from Japanese Patent Application No. 2019-526858, 4 sheets.
Decision to Grant a Patent dated Aug. 17, 2021, from Japanese Patent Application No. 2019-526858, 4 sheets.
International Search Report and Written Opinion dated Jul. 31, 2018, from International Application No. PCT/JP2018/023771, 13 sheets.
"3GPP TR 26.918 V0.7.0 (Apr. 2017)", 3GPP, [online], May 3, 2017, pp. 1-20, 58, [retrieved on Jul. 11, 2018], retrieved from the internet: <URL:http://www.3gpp.org/ftp//Specs/archive/26_series/26.918/26918-070.zip>, especially, see section 4.2.5.5 and fig. 4.13.

* cited by examiner

FIG.9A

```
---
; manifest file sample
[VR_Movie_1]
Projection="EQ"
3D="NO"
left_position=0
top_position=0
x_size=2760
y_size=1920
h_angle=258.75
v_angle=180
[VirtualScreen_1]
3D="NO"
virtualscreen_rotate=1
virtualscreen_devided=1
left_position_1=2760
top_position_1=0
x_size_1=1080
y_size_1=1920
overlay_size_degree_1=25
overlay_position_x_degree_1=0
overlay_position_y_degree_1=0
---
```

FIG.9B

```
---
; manifest file sample
[VR_Movie_1]
Projection="EQ"
3D="NO"
left_position=0
top_position=0
x_size=3840
y_size=1920
h_angle=360
v_angle=180
[VirtualScreen_1]
3D="NO"
virtualscreen_rotate=0
virtualscreen_devided=3
virtualscreen_devided_Type=1
left_position_1=0
top_position_1=1920
x_size_1=1280
y_size_1=240
left_position_2=1280
top_position_2=1920
x_size_2=1280
y_size_2=240
left_position_3=2560
top_position_3=1920
x_size_3=1280
y_size_3=240
overlay_size_degree_1=25
overlay_position_x_degree_1=-15
overlay_position_y_degree_1=10
---
```

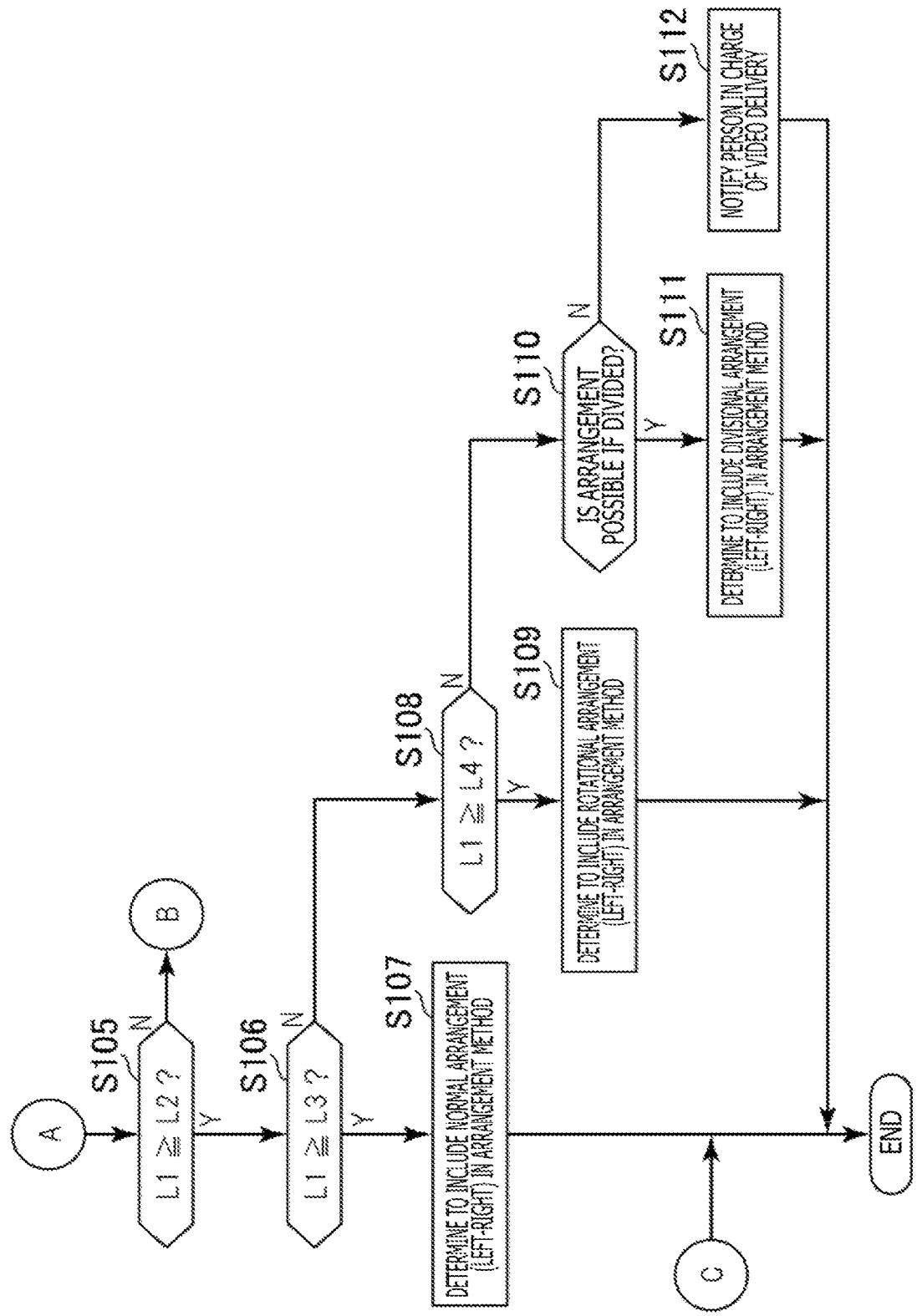

FIG.15

```
---
; manifest file sample
[VR_Movie_1]
Projection="EQ"
3D="NO"
left_position=0
top_position=120
x_size=2560
y_size=1920
h_angle=240
v_angle=180
[VirtualScreen_1]
3D="NO"
virtualscreen_rotate=0
virtualscreen_devided=1
left_position_1=2560
top_position_1=120
x_size_1=1280
y_size_1=720
overlay_size_degree_1=25
overlay_position_x_degree_1=-15
overlay_position_y_degree_1=10
[VirtualScreen_2]
3D="NO"
virtualscreen_rotate=0
virtualscreen_devided=1
left_position_1=2560
top_position_1=840
x_size_1=1280
y_size_1=720
overlay_size_degree_1=35
overlay_position_x_degree_1=25
overlay_position_y_degree_1=20
---
```

FIG.17

```
; manifest file sample
[VR_Movie_1]
Projection="EQ"
3D="NO"
left_position=0
top_position=0
x_size=1920
y_size=1920
h_angle=180
v_angle=180
[VR_Movie_2]
Projection="EQ"
3D="NO"
left_position=1920
top_position=0
x_size=1920
y_size=1920
h_angle=180
v_angle=180
[VirtualScreen_1]
3D="NO"
virtualscreen_rotate=0
virtualscreen_devided=3
virtualscreen_devided_Type=1
left_position_1=0
top_position_1=1920
x_size_1=1280
y_size_1=240
left_position_2=1280
top_position_2=1920
x_size_2=1280
y_size_2=240
left_position_3=2560
top_position_3=1920
x_size_3=1280
y_size_3=240
overlay_size_degree_1=25
overlay_position_x_degree_1=-15
overlay_position_y_degree_1=10
overlay_size_degree_2=0
```

FIG.19

```
---
; manifest file sample
[VR_Movie_1]
Projection="EQ"
3D="SBS"
left_position=0
top_position=0
x_size=3840
y_size=1920
h_angle=180
v_angle=180
[VirtualScreen_1]
3D="NO"
virtualscreen_rotate=0
virtualscreen_devided=3
virtualscreen_devided_Type=1
left_position_1=0
top_position_1=1920
x_size_1=1280
y_size_1=240
left_position_2=1280
top_position_2=1920
x_size_2=1280
y_size_2=240
left_position_3=2560
top_position_3=1920
x_size_3=1280
y_size_3=240
overlay_size_degree_1=25
overlay_position_x_degree_1=-15
overlay_position_y_degree_1=10
---
```

IMAGE ARRANGEMENT DETERMINATION APPARATUS, DISPLAY CONTROLLING APPARATUS, IMAGE ARRANGEMENT DETERMINATION METHOD, DISPLAY CONTROLLING METHOD, AND PROGRAM

TECHNICAL FIELD

The present invention relates to an image arrangement determination apparatus, a display controlling apparatus, an image arrangement determination method, a display controlling method, and a program.

BACKGROUND ART

In recent years, video delivery via the Internet has become popular. As an example of the technology for such video delivery, a technology of transmitting a plurality of videos collectively as one video stream exists. For example, PTL 1 and PTL 2 describe a technology of decoding video contents to be synthesized once, changing the size and encoding the resulting contents after image synthesis to generate an encoded stream of a transmission target including a plurality of video contents.

CITATION LIST

Patent Literature

[PTL 1]
Japanese Patent Laid-Open No. 2012-099890
[PTL 2]
Japanese Patent Laid-Open No. 2013-172374

SUMMARY

Technical Problem

When a video stream including a plurality of video contents is transmitted, if it can be transmitted using existing video delivery facilities without introducing video delivery facilities for exclusive use, then this does not take time and effort for introduction of video delivery facilities and can suppress an extra cost to be incurred.

Therefore, the inventors of the present invention are considering transmitting a video stream that has a plurality of frame images of different video contents arranged therein and includes frame images having vertical and horizontal lengths according to standards with which existing video delivery facilities are compatible.

In the following description, a frame image that configures a video stream to be transmitted is referred to as synthetic frame image, and each of frame images of respective video contents arranged in a synthetic frame image is hereinafter referred to as individual frame image.

Here, if a plurality of individual frame images are not arranged appropriately with respect to a synthetic frame image in compliance with a given standard, then the area occupied by a margin that does not contribute to a video displayed in the synthetic frame image becomes great. However, the technology disclosed in PTL 1 or PTL 2 cannot determine appropriate arrangement of an individual frame image with respect to a synthetic frame image.

The present invention has been made taking the above-described subject into consideration, and one of objects of the present invention resides in provision of an image arrangement determination apparatus, a display controlling apparatus, an image arrangement determination method, a display controlling method, and a program that can determine appropriate arrangement of an individual frame image with respect to a synthetic frame image according to a given standard.

Solution to Problem

In order to solve the subject described above, an image arrangement determination apparatus according to the present invention includes an acquisition section configured to acquire a plurality of images including a first image and a second image, a margin specification section configured to specify a margin when the first image is arranged by a given first arrangement method in a region occupied by a third image that is a delivery target, and a determination section configured to determine an arrangement method by which the second image is to be arranged in the margin as a second arrangement method based on a shape of the margin and a shape of the second image.

In one aspect of the present invention, the image arrangement determination apparatus further includes a transmission section configured to transmit the third image in which the first image is arranged by the first arrangement method and the second image is arranged by the second arrangement method.

Further, in one aspect of the present invention, in a case in which it is decided that, when the second image is arranged lined up with the first image in a same direction as that of the first image in the margin, the second image protrudes from the margin, the determination section determines a method by which the second image is arranged in a direction different from that of the first image in the margin as the second arrangement method.

As an alternative, in a case in which it is decided that it is possible to arrange the second image in a direction different from that of the first image in the margin, the determination section determines a method of the arrangement as the second arrangement method.

Further, in one aspect of the present invention, in a case in which it is decided that it is possible to arrange the second image in the margin by changing a direction in which divisional images when the second image is divided are lined up, the determination section determines a method of the arrangement as the second arrangement method.

Further, in one aspect of the present invention, in a case in which the margin has a size smaller than a size of the second image, the determination section determines an arrangement method by which the second image is reduced and then arranged in the margin as the second arrangement method.

Meanwhile, a display controlling apparatus according to the present invention includes an image reception section configured to receive a third image that includes a first region occupied by a first image and a second region occupied by a second image, a data reception section configured to receive data indicative of a first arrangement method that is an arrangement method of the first image in the third image and a second image arrangement method that is an arrangement method of the second image in the third image, an extraction section configured to extract the first image and the second image from the third image based on the first arrangement method and the second arrangement method indicated by the data, and a display controlling section configured to cause at least one of the first image and the second image extracted to be displayed.

Further, an image arrangement determination method according to the present invention includes a step of acquiring a plurality of images including a first image and a second image, a step of specifying a margin when the first image is arranged by a given first arrangement method in a region occupied by a third image that is a delivery target, and a step of determining an arrangement method by which the second image is to be arranged in the margin as a second arrangement method based on a shape of the margin and a shape of the second image.

Further, a display controlling method according to the present invention includes a step of receiving a third image that includes a first region occupied by a first image and a second region occupied by a second image, a step of receiving data indicative of a first arrangement method that is an arrangement method of the first image in the third image and a second image arrangement method that is an arrangement method of the second image in the third image, a step of extracting the first image and the second image from the third image based on the first arrangement method and the second arrangement method indicated by the data, and a step of causing at least one of the first image and the second image extracted to be displayed.

Further, a program according to the present invention causes a computer to execute a procedure for acquiring a plurality of images including a first image and a second image, a procedure for specifying a margin when the first image is arranged by a given first arrangement method in a region occupied by a third image that is a delivery target, and a procedure for determining an arrangement method by which the second image is to be arranged in the margin as a second arrangement method based on a shape of the margin and a shape of the second image.

Further, another program according to the present invention causes a computer to execute a procedure for receiving a third image that includes a first region occupied by a first image and a second region occupied by a second image, a procedure for receiving data indicative of a first arrangement method that is an arrangement method of the first image in the third image and a second image arrangement method that is an arrangement method of the second image in the third image, a procedure for extracting the first image and the second image from the third image based on the first arrangement method and the second arrangement method indicated by the data, and a procedure for causing at least one of the first image and the second image extracted to be displayed.

BRIEF DESCRIPTION OF DRAWINGS

FIG. 9A is a view depicting an example of a manifest file.

FIG. 9B is a view depicting an example of a manifest file.

FIG. 10B is a flow chart depicting an example of a flow of processing performed by a video delivery apparatus according to an embodiment of the present invention.

FIG. 15 is a view depicting an example of a manifest file.

FIG. 17 is a view depicting an example of a manifest file.

FIG. 19 is a view depicting an example of a manifest file.

DESCRIPTION OF EMBODIMENT

In the following, an embodiment of the present invention is described in detail with reference to the drawings.

Figure 1:
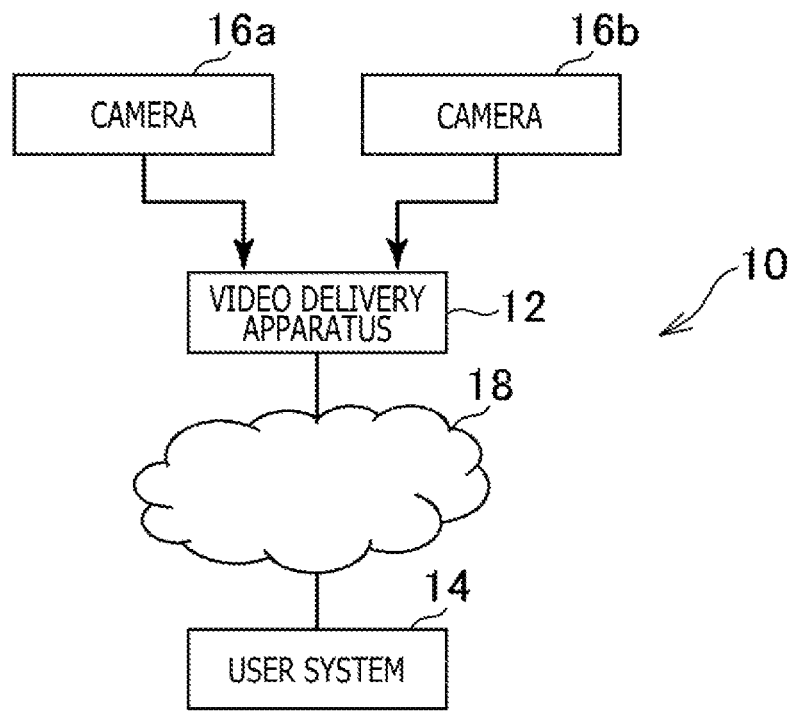
FIG. 1 is a view depicting an example of a general configuration of a video delivery system according to an embodiment of the present invention.

FIG. 1 is a view depicting an example of a general configuration of a video delivery system 10 according to an embodiment of the present invention. As depicted in FIG. 1, the video delivery system 10 according to the present embodiment includes a video delivery apparatus 12, a user system 14 and cameras 16 (a camera 16a and another camera 16b). The video delivery apparatus 12 and the user system 14 are connected to a computer network 18 such as the Internet such that the video delivery apparatus 12 and the user system 14 can communicate with each other. Further, the cameras 16 and the video delivery apparatus 12 are communicatable with each other, and a video captured by any of the cameras 16 is transmitted to the video delivery apparatus 12.

Figure 2:
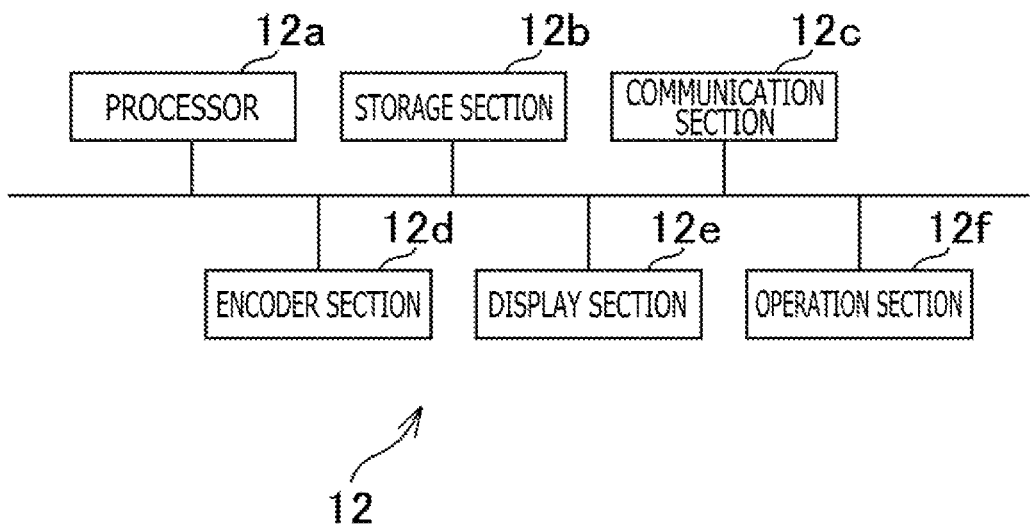
FIG. 2 is a view depicting an example of a configuration of a video delivery apparatus according to an embodiment of the present invention.

FIG. 2 is a view depicting an example of a configuration of the video delivery apparatus 12 according to the present embodiment. The video delivery apparatus 12 according to the present embodiment is a computer such as, for example, a video delivery server. As depicted in FIG. 2, the video delivery apparatus 12 according to the present embodiment includes, for example, a processor 12a, a storage section 12b, a communication section 12c, an encoder section 12d, a display section 12e, an operation section 12f and so forth.

The processor 12a is a control device such as, for example, a microprocessor that operates in accordance with a program installed in the video delivery apparatus 12.

The storage section 12b is a storage device such as, for example, a read only memory (ROM) or a random access memory (RAM), a hard disk drive or the like. Into the storage section 12b, a program to be executed by the processor 12a and so forth are stored.

The communication section 12c is a communication interface such as, for example, a network board or a wireless local area network (LAN) module.

The encoder section 12d is a hardware encoder that encodes, for example, data of a content of a video or the like generated by the processor 12a or data of a content of a video or the like stored in the storage section 12b.

The display section 12e is a display device such as a liquid crystal display and displays various images in accordance with an instruction from the processor 12a.

The operation section 12f is a user interface such as a keyboard, a mouse, a controller of a game console or the like, and accepts an operation input made by a user and outputs a signal representative of the substance of the operation input to the processor 12a.

Figure 3:
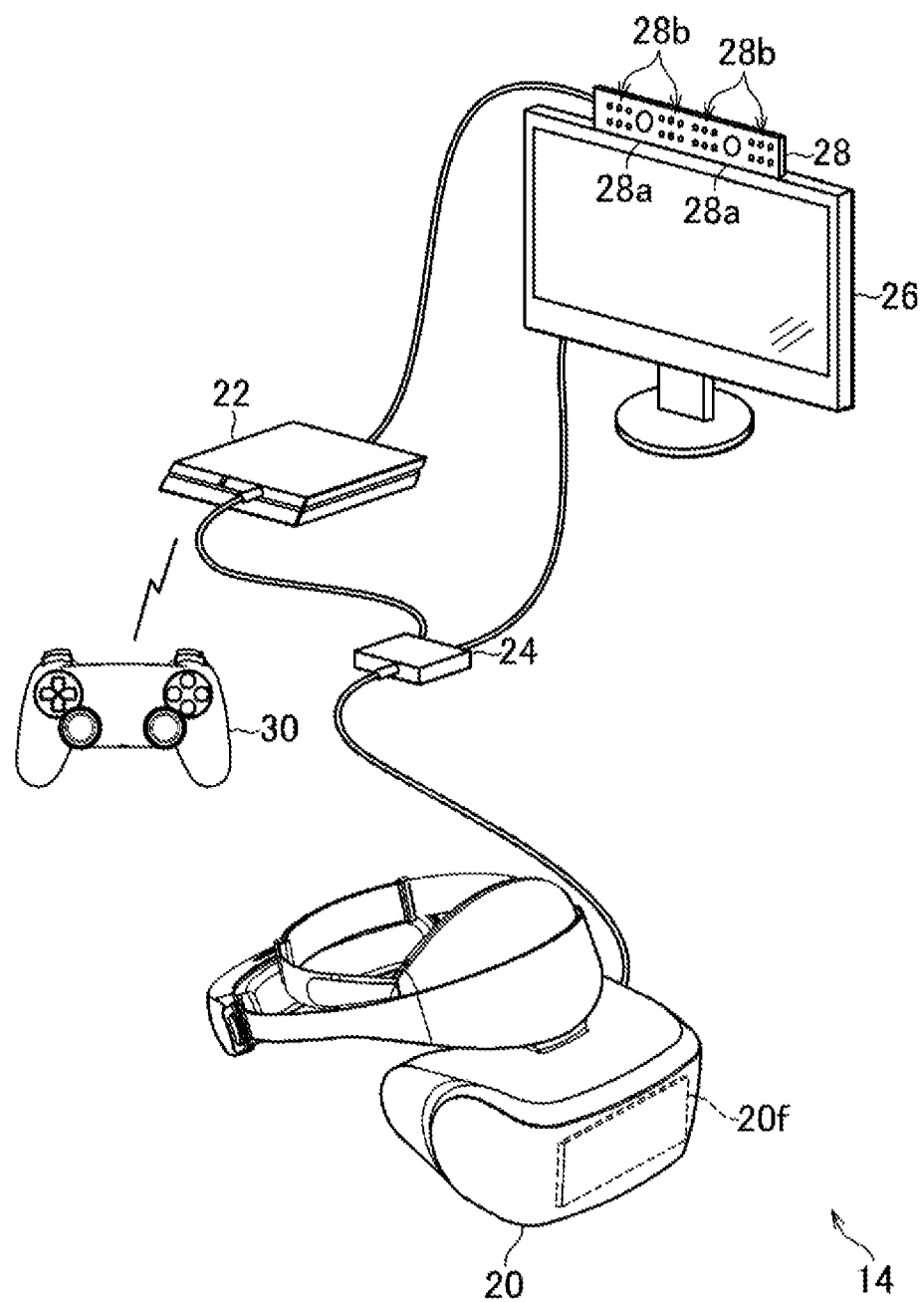
FIG. 3 is a view depicting an example of a configuration of a user system according to an embodiment of the present invention.
Figure 4:
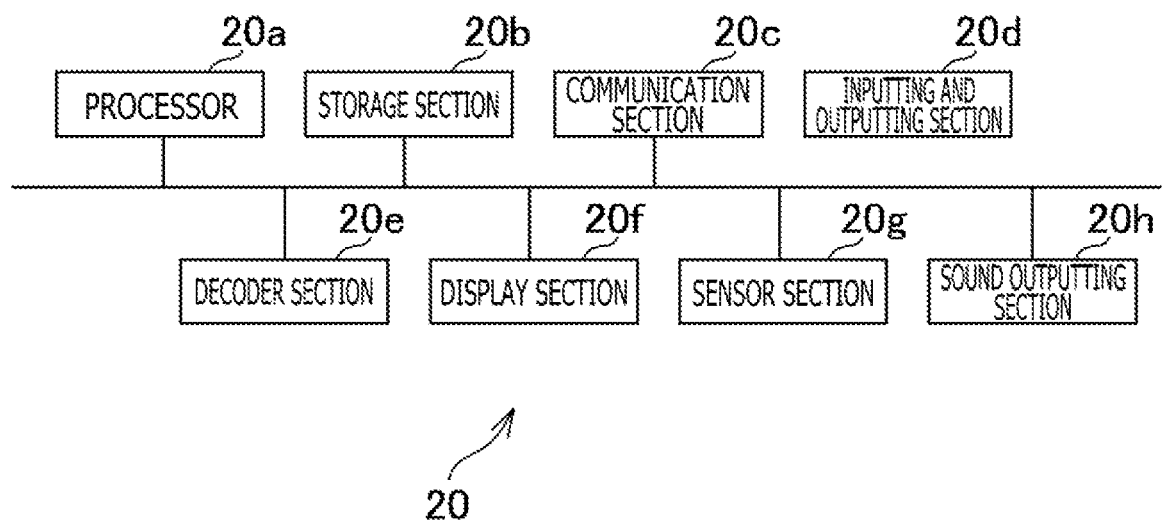
FIG. 4 is a view depicting an example of a configuration of a head mounted display according to an embodiment of the present invention.

FIG. 3 is a view depicting an example of a configuration of the user system 14 according to an embodiment of the present invention. FIG. 4 is a view depicting an example of a configuration of a head mounted display (HMD) 20 according to the present embodiment.

As depicted in FIG. 3, the user system 14 according to the present embodiment includes the HMD 20, an entertainment apparatus 22, a relay apparatus 24, a display 26, a camera microphone unit 28, and a controller 30.

The HMD 20 according to the present embodiment includes, for example, as depicted in FIG. 4, a processor 20a, a storage section 20b, a communication section 20c, an inputting and outputting section 20d, a decoder section 20e, a display section 20f, a sensor section 20g and a sound outputting section 20h.

The processor 20a is a program-controlled device such as a microprocessor that operates in accordance with a program, for example, installed in the HMD 20.

The storage section 20b is a storage device such as, for example, a ROM or a RAM. In the storage section 20b, a program to be executed by the processor 20a and so forth are stored.

The communication section 20c is a communication interface such as, for example, a network board or a wireless LAN module.

The inputting and outputting section 20d is an input/output port such as, for example, a high-definition multimedia interface (HDMI) (registered trademark) port, a universal serial bus (USB) port, or an auxiliary (AUX) port.

The decoder section 20e is hardware for performing decoding of data, for example, of a content. The decoder section 20e decodes data of a content received, for example, by the communication section 20c or the inputting and outputting section 20d.

The display section 20f is a display such as, for example, a liquid crystal display or an organic electroluminescence (EL) display disposed on the front side of the HMD 20, and displays a video generated by the entertainment apparatus 22, a video received by the entertainment apparatus 22, or the like. Further, the display section 20f is accommodated in a housing of the HMD 20. The display section 20f may output a video represented by a video signal outputted from the entertainment apparatus 22, relayed by the relay apparatus 24, and received, for example, by the communication section 20c or the inputting and outputting section 20d. The display section 20f according to the present embodiment can display a three-dimensional image, for example, by displaying an image for the left eye and an image for the right eye. It is to be noted that the display section 20f may otherwise be of the type that cannot display a three-dimensional image but can display only a two-dimensional image.

The sensor section 20g includes sensors such as, for example, an acceleration sensor and a motion sensor. The sensor section 20g outputs measurement results of a rotation amount and an amount of movement of the HMD 20 at a predetermined sampling rate to the processor 20a.

The sound outputting section 20h is, for example, a headphone, a speaker, and so forth and outputs sound represented by sound data generated by the entertainment apparatus 22, sound represented by sound data received by the entertainment apparatus 22, and so forth. The sound outputting section 20h outputs sound represented by a sound signal outputted from the entertainment apparatus 22, relayed by the relay apparatus 24, and received, for example, by the communication section 20c or the inputting and outputting section 20d.

The entertainment apparatus 22 according to the present embodiment is a computer such as, for example, a game console, a digital versatile disc (DVD) player, or a Blu-ray (registered trademark) player. The entertainment apparatus 22 according to the present embodiment generates a video or a sound, for example, by execution of a game program stored or by reproduction of a content recorded on an optical disk or the like. Then, the entertainment apparatus 22 according to the present embodiment outputs a video signal representative of a video generated or an audio signal representative of a sound generated to the HMD 20 or the display 26 through the relay apparatus 24.

Further, the entertainment apparatus 22 according to the present embodiment receives a video signal or an audio signal transmitted from the video delivery apparatus 12 and outputs the video signal or the audio signal to the HMD 20 or the display 26 through the relay apparatus 24.

The relay apparatus 24 according to the present embodiment is a computer that relays and outputs a video signal or an audio signal outputted from the entertainment apparatus 22 to the HMD 20 or the display 26.

The camera microphone unit 28 according to the present embodiment includes a camera 28a that outputs, for example, an image obtained by capturing an imaging object to the entertainment apparatus 22 and a microphone 28b that acquires surrounding sound, converts the sound into audio data, and outputs the audio data to the entertainment apparatus 22. Further, the camera 28a according to the present embodiment is a stereo camera.

The HMD 20 and the relay apparatus 24 are connected to each other, for example, by an HDMI cable or a USB cable such that they can transfer data therebetween. It is to be noted that the HMD 20 may perform transfer of data to and from the relay apparatus 24 through the communication section 20c. The entertainment apparatus 22 and the relay apparatus 24 are connected to each other, for example, by an HDMI cable, a USB cable, or the like such that they can transfer data therebetween. The relay apparatus 24 and the display 26 are connected to each other, for example, by an HDMI cable or the like. The entertainment apparatus 22 and the camera microphone unit 28 are connected to each other, for example, an AUX cable or the like.

The controller 30 according to the present embodiment is an operation inputting apparatus for performing operation inputting to the entertainment apparatus 22. The user can perform various kinds of operation inputting using the controller 30 by depressing a direction key or a button or tilting an operation stick provided on the controller 30. The controller 30 according to the present embodiment outputs input data associated with operation inputting to the entertainment apparatus 22. Further, the controller 30 according to the present embodiment includes a USB port. The controller 30 can output input data by wire to the entertainment apparatus 22 by connecting to the entertainment apparatus 22 with a USB cable. Further, the controller 30 according to the present embodiment includes a wireless communication module or the like such that it can also output input data wirelessly to the entertainment apparatus 22.

In the present embodiment, a video representative of a manner of an event venue where an event such as a concert takes place is captured by the cameras 16. Here, it is assumed that, for example, videos different from each other are captured from positions different from each other by the camera 16a and the camera 16b. For example, a general state of the event venue may be imaged by the camera 16a and a performer on a stage in the event venue may be imaged particularly by the camera 16b. Further, the camera 16a is, for example, an omnidirectional camera and may be a camera that can capture a video of a viewing angle greater than 180 degrees.

In the following description, a video captured by the camera 16a is referred to as VR video, and a video captured by the camera 16b is referred to as virtual screen video.

Thus, the video delivery apparatus 12 according to the present embodiment receives a video captured, for example, by the camera 16a and/or the camera 16b. Then, the video delivery apparatus 12 generates a frame image in which, for example, a frame image captured by the camera 16a and a frame image captured by the camera 16b at the same time as the frame image captured by the camera 16a are arranged. Here, for example, a frame image in which a frame image captured by the camera 16a and a frame image captured by the camera 16b, which are associated with a same timestamp, are arranged may be generated.

In the following description, a frame image captured by the camera 16a and a frame image captured by the camera 16b are each referred to as individual frame image, and a frame image in which a plurality of individual frame images are arranged is referred to as synthetic frame image. Further, an individual frame image captured by the camera 16a is referred to as VR frame image 40, and an individual frame image captured by the camera 16b is referred to as virtual screen frame image 42 (refer to FIGS. 5A and 5B).

Then, in the present embodiment, after a video including a synthetic frame image generated in this manner is encoded, it is delivered from the video delivery apparatus 12 to the user system 14. Then, the video delivered from the video delivery apparatus 12 is decoded by the user system 14. Then, the user system 14 extracts, from the synthetic frame image included in the decoded video, the VR frame image 40 and the virtual screen frame image 42. Then, the user system 14 generates texture images 44 (44a and 44b) exemplified in FIGS. 5A and 5B on the basis of the extracted VR frame image 40 and virtual screen frame image 42.

Figure 6:
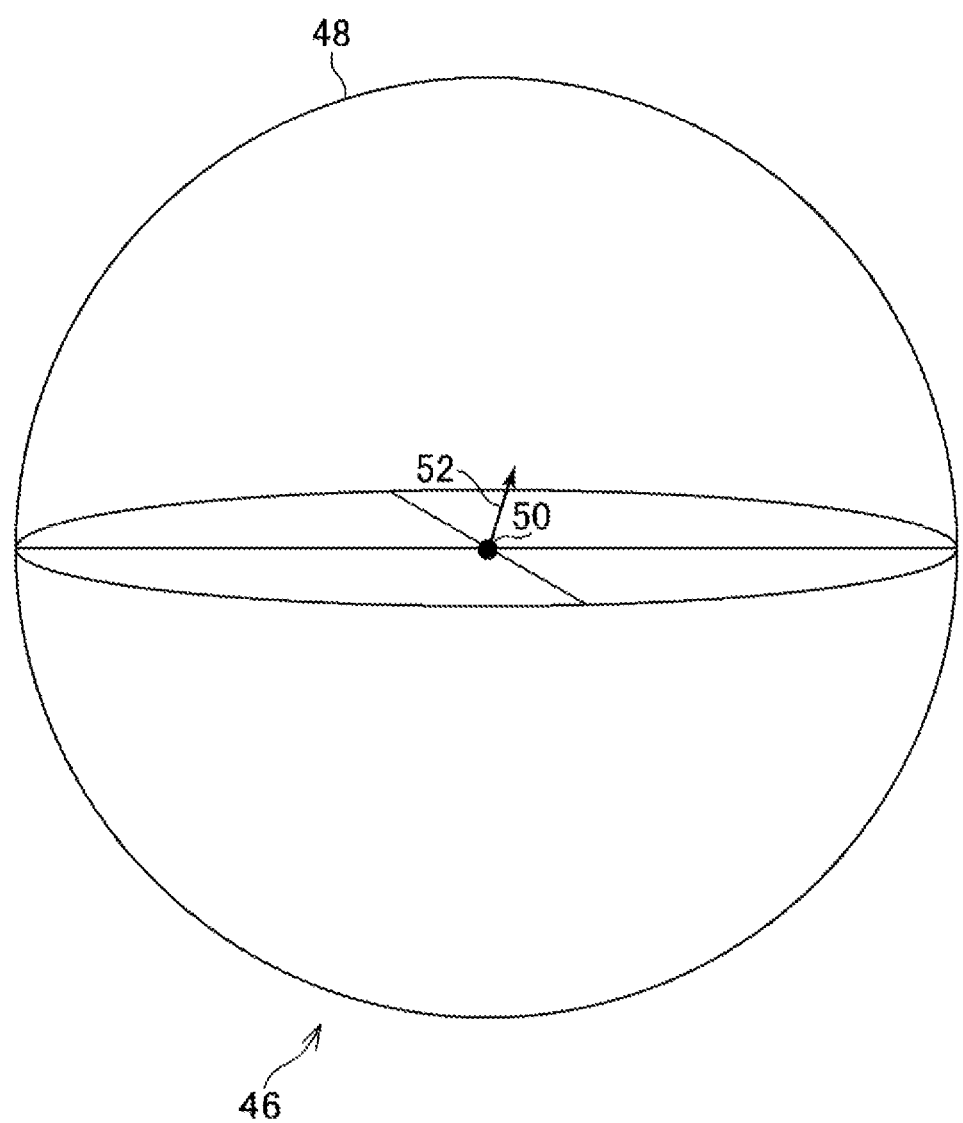
FIG. 6 is a view depicting an example of a virtual space.

In the present embodiment, for example, each texture image 44 generated is mapped to the inside of a background object 48 that is a spherical virtual object arranged in a virtual space 46 exemplified in FIG. 6.

Then, an image representative of a state when a user views a gaze direction 52 from a viewpoint 50 arranged at the center of the background object 48 is displayed on the display section 20f of the HMD 20. In the present embodiment, for example, part of the texture image 44 mapped to the inner side of the background object 48 is displayed on the display section 20f. Here, for example, the position of the viewpoint 50 and/or the gaze direction 52 in the virtual space 46 may be changed in response to a change of the position or the direction of the head of the user having the HMD 20 mounted thereon which change is detected by the sensor section 20g. This makes it possible for the user to visualize various portions of the texture image 44 by changing the direction of its head.

Figure 5A:
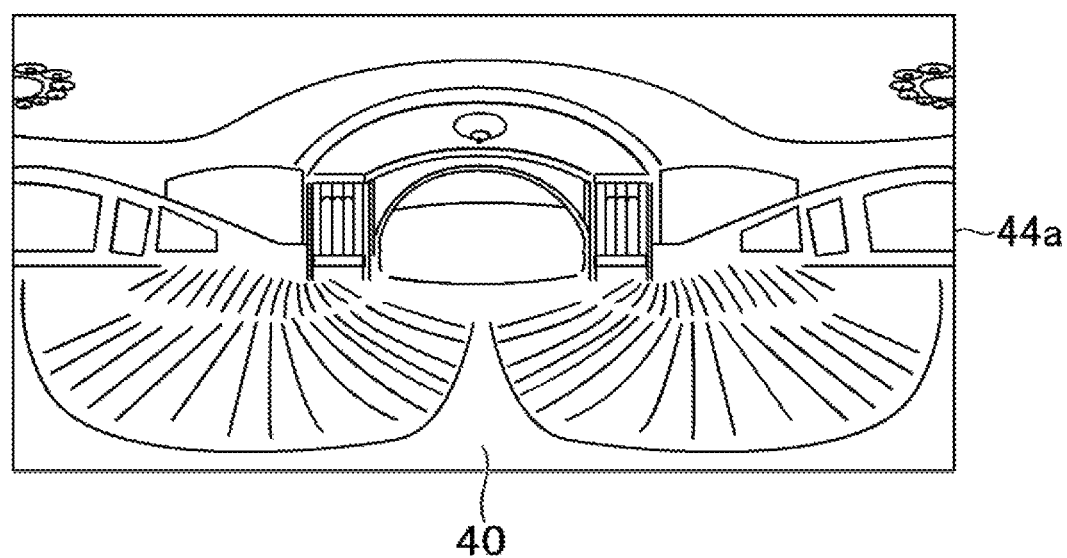
FIG. 5A is a view depicting an example of a texture image.

In FIG. 5A, the VR frame image 40 is indicated as the texture image 44a. Meanwhile, in FIG. 5B, an image in which the virtual screen frame image 42 is arranged in superposition at a position at which an image of the stage is arranged in the VR frame image 40 is indicated as the texture image 44b. It is to be noted that, in the texture image 44b depicted in FIG. 5B, the virtual screen frame image 42 may be arranged in superposition on the VR frame image 40 after deformed such that it is displayed as a rectangular image on the display section 20f. Further, the texture image 44b in which the virtual screen frame image 42 is arranged in superposition on the VR frame image 40 need not be mapped to the inner side of the background object 48. For example, the virtual screen frame image 42 may be mapped as the texture image 44b to a plate-shaped virtual object arranged in the virtual space 46.

Further, in the present embodiment, a state in which the VR frame image 40 is used as the texture image 44a and another state in which the VR frame image 40 on which the virtual screen frame image 42 is superposed is used as the texture image 44b can be switched therebetween. Here, it may be made possible to switch the two states just described, for example, by the user operating the controller 30.

In this manner, according to the present embodiment, individual frame images captured by the plurality of cameras 16 can be provided collectively as one synthetic frame image to the user.

Here, it is assumed that, in the present embodiment, the vertical and horizontal lengths of a synthetic frame image are determined in advance. Then, in the present embodiment, an arrangement method for the virtual screen frame image 42 is determined in the following manner on the basis of the shape of a margin when the VR frame image 40 is arranged by an arrangement method determined in advance on a synthetic frame image. Therefore, according to the present embodiment, appropriate arrangement of individual frame images in a synthetic frame image according to a given standard can be determined.

Figure 7A:
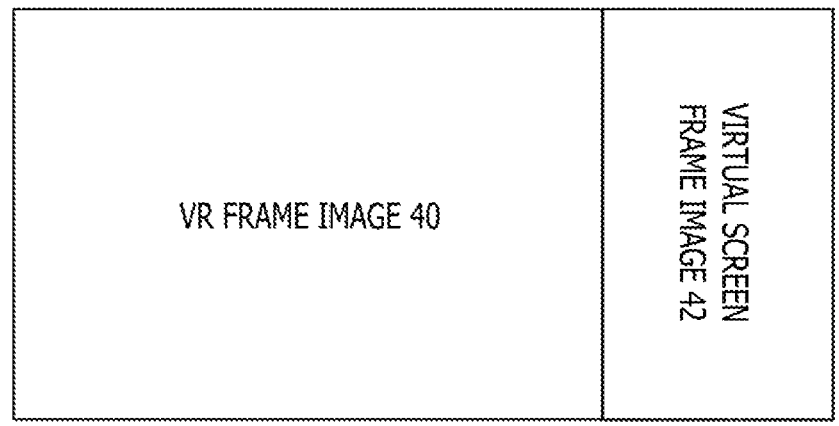
FIG. 7A is a view depicting an example of an arrangement method of an image.
Figure 7B:
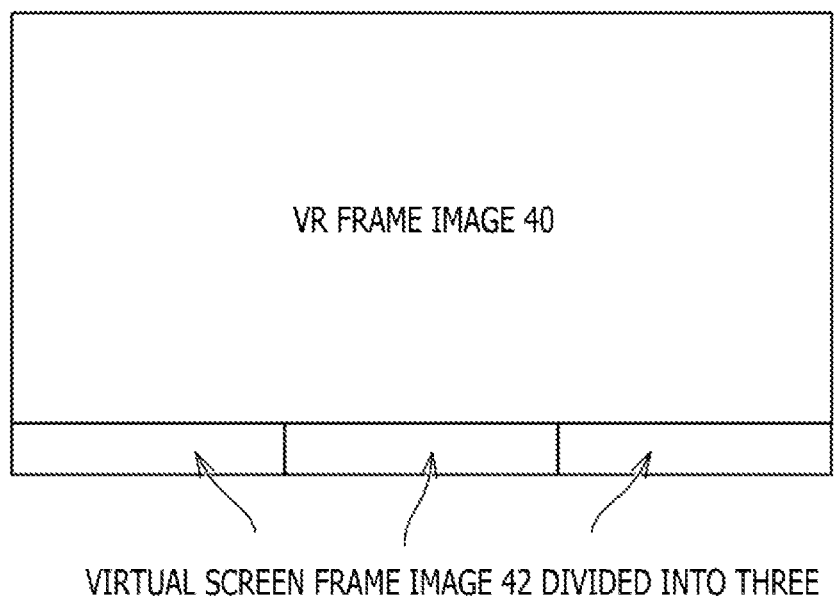
FIG. 7B is a view depicting an example of an arrangement method of an image.

In FIGS. 7A and 7B, examples of the arrangement method of the VR frame image 40 and the virtual screen frame image 42 are depicted. It is assumed that, not only in the example of FIG. 7A but also in the example of FIG. 7B, the VR frame image 40 is arranged in the upper left corner of the synthetic frame image.

In the example of FIG. 7A, the virtual screen frame image 42 is arranged on the right side of the VR frame image 40 in a state in which it is rotated by 90 degrees clockwise with respect to the VR frame image 40. Meanwhile, in the example of FIG. 7B, the virtual screen frame image 42 is horizontally divided into three and is arranged under the VR frame image 40 after the lined up direction of the divisional images of the divided virtual screen frame image 42 is changed from the vertical direction to the horizontal direction. As the arrangement method for the virtual screen frame image 42, for example, a method of arranging the same in rotation or a method of arranging the same in division may be determined in this manner.

In the following, functions of the video delivery apparatus 12 and the HMD 20 according to the present embodiment and processes executed by the video delivery apparatus 12 and the HMD 20 are described further.

Figure 8:
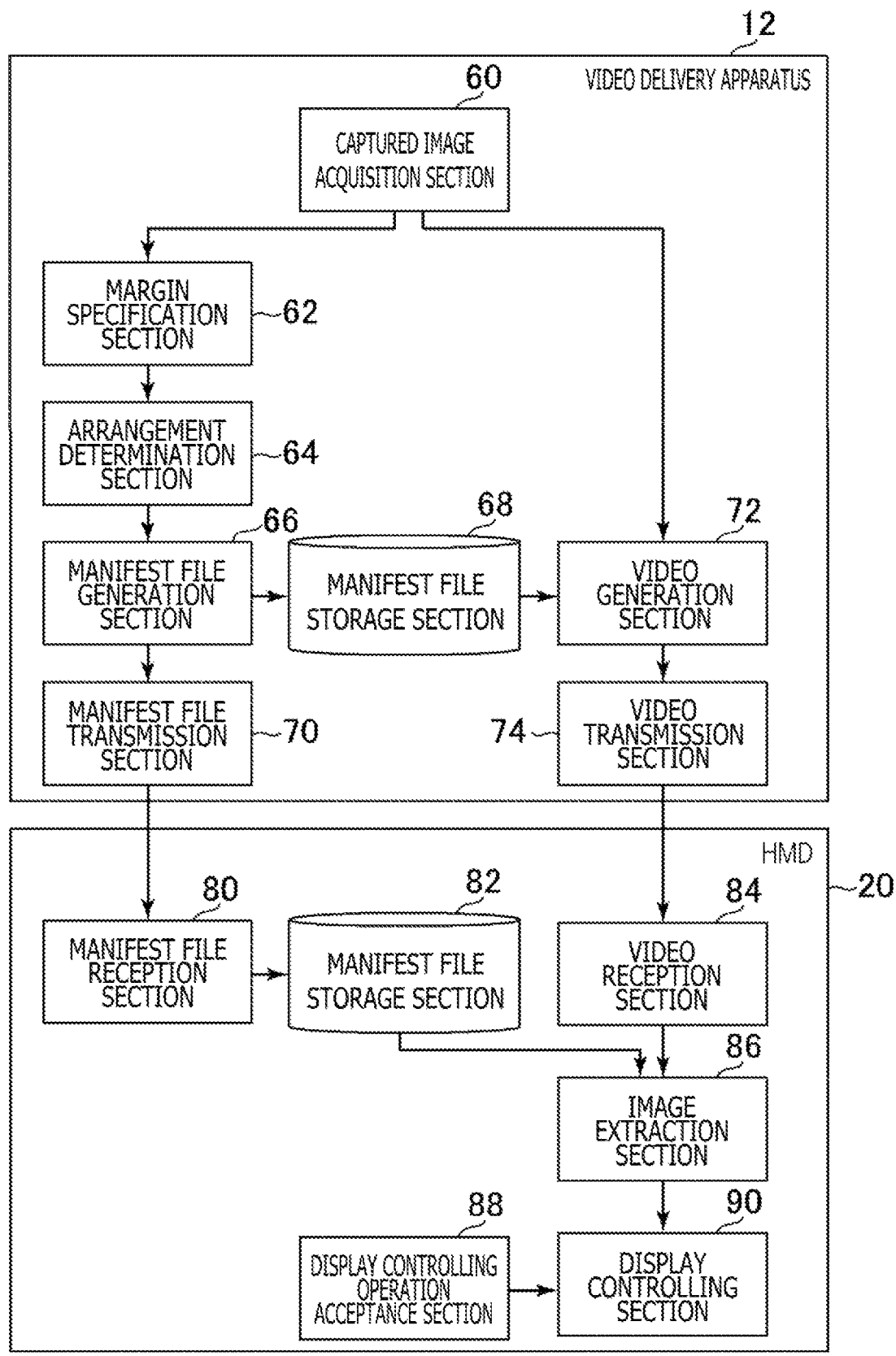
FIG. 8 is a functional block diagram depicting an example of functions incorporated in a video delivery apparatus and a head mounted display server according to an embodiment of the present invention.

FIG. 8 is a functional block diagram depicting an example of functions incorporated in the video delivery apparatus 12 and the HMD 20 according to the present embodiment. It is to be noted that, in the video delivery apparatus 12 and the HMD 20 according to the present embodiment, all of the functions depicted in FIG. 8 need not be incorporated, and functions other than the functions depicted in FIG. 8 may be incorporated.

As depicted in FIG. 8, the video delivery apparatus 12 functionally includes, for example, a captured image acquisition section 60, a margin specification section 62, an arrangement determination section 64, a manifest file generation section 66, a manifest file storage section 68, a manifest file transmission section 70, a video generation section 72, and a video transmission section 74. The captured image acquisition section 60 is incorporated principally as the processor 12a and the communication section 12c. The margin specification section 62, the arrangement determination section 64, and the manifest file generation section 66 are incorporated principally as the processor 12a. The manifest file storage section 68 is incorporated principally as the storage section 12b. The manifest file transmission section 70 and the video transmission section 74 are incorporated principally as the communication section 12c. The video generation section 72 is incorporated principally as the processor 12a and the encoder section 12d. The video delivery apparatus 12 according to the present embodiment plays a role as an image arrangement determination apparatus for determining arrangement of the VR frame image 40 and the virtual screen frame image 42 in a synthetic frame image.

The functions described above may be incorporated by the processor 12a executing a program installed in the video delivery apparatus 12 that is a computer and including instructions corresponding to the functions described above. This program may be supplied to the video delivery apparatus 12 through a computer-readable information storage medium such as, for example, an optical disk, a magnetic disk, a magnetic tape, a magneto-optical disk, or a flash memory or through the Internet or the like.

Meanwhile, as depicted in FIG. 8, the HMD 20 functionally includes, for example, a manifest file reception section 80, a manifest file storage section 82, a video reception section 84, an image extraction section 86, a display controlling operation acceptance section 88, and a display controlling section 90. The manifest file reception section 80 and the video reception section 84 are incorporated principally as the inputting and outputting section 20d or the communication section 20c. The manifest file storage section 82 is incorporated principally as the storage section 20b. The image extraction section 86 is incorporated principally as the processor 20a and the decoder section 20e. The display controlling operation acceptance section 88 is incorporated principally as the processor 20a and the inputting and outputting section 20d. It is to be noted that the display controlling operation acceptance section 88 may be incorporated principally as the processor 20a and the communication section 20c. The display controlling section 90 is incorporated principally as the processor 20a and the display section 20f. The HMD 20 according to the present embodiment plays a role as a display controlling apparatus for causing at least one of the VR frame image 40 and the virtual screen frame image 42 to be displayed.

The functions described above may be incorporated by the processor 20a executing a program installed in the HMD 20 that is a computer and including instructions corresponding to the functions described above. This program may be supplied to the HMD 20 through a computer-readable information storage medium such as, for example, an optical disk, a magnetic disk, a magnetic tape, a magneto-optical disk, or a flash memory or through the Internet or the like.

The captured image acquisition section 60 acquires a plurality of images including, in the present embodiment, for example, a VR frame image 40 and a virtual screen frame image 42. The captured image acquisition section 60 acquires, for example, a video captured by the camera 16a and a video captured by the camera 16b.

The margin specification section 62 specifies a margin when, in the present embodiment, for example, a VR frame image 40 is arranged into a region occupied by a synthetic frame image of a delivery target by a predetermined first arrangement method. Here, the predetermined first arrangement is, in the examples described hereinabove, a method of arranging the VR frame image 40 in the upper left corner of the synthetic frame image.

Here, the margin specification section 62 may specify a margin on the basis of the vertical and horizontal lengths of a VR frame image 40, a virtual screen frame image 42, and a synthetic frame image inputted, for example, by an operator (person in charge of video delivery) of the video delivery apparatus 12. Alternatively, the margin specification section 62 may specify a margin, for example, on the basis of the vertical and horizontal lengths of a VR frame image 40 and a virtual screen frame image 42 acquired by the captured image acquisition section 60 and a synthetic frame image indicated by a setting file or the like of the video delivery apparatus 12.

The arrangement determination section 64 determines, in the present embodiment, for example, on the basis of the shape of the margin specified by the margin specification section 62 and the shape of the virtual screen frame image 42, a second arrangement method of arranging the virtual screen frame image 42 in the margin. Here, such a method of arranging the virtual screen frame image 42 in rotation or a method of arranging the virtual screen frame image 42 in division as described above may be determined as the second arrangement method. Alternatively, for example, an arrangement method of reducing the virtual screen frame image 42 and arranging the reduced virtual screen frame image 42 into a margin as hereinafter described may be determined as the second arrangement method.

The manifest file generation section 66 generates data that indicates, in the present embodiment, for example, at least the first arrangement method described hereinabove and the second arrangement method described hereinabove and indicates values of attributes of individual frame images. Here, for example, a manifest file in which values of attributes of individual frame images are described may be generated. Further, in the present embodiment, the manifest file generation section 66 stores the generated manifest file into the manifest file storage section 68.

FIG. 9A depicts an example of a manifest file associated with the arrangement of FIG. 7A, and FIG. 9B depicts an example of a manifest file associated with the arrangement of FIG. 7B.

In the examples of FIGS. 9A and 9B, values of attributes of the VR frame image 40 are indicated from a line next to [VR_Movie_1] to a line preceding to [VirtualScreen_1].

For example, the form of projection of the VR frame image 40 is set as a value of the attribute Projection. As depicted in FIGS. 9A and 9B, in the case where the form of projection is equal distance cylindrical projection, the value "EQ" is set as a value of the attribute Projection.

Further, for example, whether or not the VR frame image 40 is a three-dimensional image is set as a value of the attribute 3D. Here, in the case where the VR frame image 40 is a three-dimensional image, the form of the same is set as a value of the attribute 3D. For example, in the case where the VR frame image 40 is a two-dimensional image, the value "NO" is set as a value of the attribute 3D. On the other hand, in the case where the VR frame image 40 is a three-dimensional image of the side by side type, the value SBS is set as a value of the attribute 3D. Further, for example, in the case where the VR frame image 40 is a three-dimensional image of the top and bottom type, the value "TB" is set as a value of the attribute 3D.

Further, for example, the coordinate value in the horizontal direction and the coordinate value in the vertical direction of the upper left corner of the VR frame image 40 in the case where the upper left corner of a synthetic frame image is determined as the origin are set as a value of the attribute left_position and a value of the attribute top_position, respectively. Further, for example, the horizontal length and the vertical length of the VR frame image 40 are set as a value of the attribute x_size and a value of the attribute y_size. Further, for example, an angle in the horizontal direction and an angle in the vertical direction covered by the VR frame image 40 are set as a value of the attribute h_angle and a value of the attribute v_angle, respectively. It is to be noted that, depending upon the value of the attribute Projection, the value of the attribute h_angle and the value of the attribute v_angle may not be set. Further, information that is unique to the projection form and is to be set may be set as a value of the attribute Extend_info.

In the examples of FIGS. 9A and 9B, values of attributes of the virtual screen frame image 42 are indicated in lines beginning with a line next to [VirtualScreen_1].

For example, whether or not the virtual screen frame image 42 is a three-dimensional image is set as a value of the attribute 3D. Here, in the case where the virtual screen frame image 42 is a three-dimensional image, the type of the same is set as a value of the attribute 3D. For example, in the case where the virtual screen frame image 42 is a two-dimensional image, the value "NO" is set as a value of the attribute 3D. On the other hand, for example, in the case where the virtual screen frame image 42 is a three-dimensional image of the side by side type, the value "SBS" is set as a value of the attribute 3D. Further, for example, in the case where the virtual screen frame image 42 is a three-dimensional image of the top and bottom type, the value "TB" is set as a value of the attribute 3D.

Further, for example, whether or not the virtual screen frame image 42 is to be arranged in a direction rotated with respect to the VR frame image 40 is set as a value of the attribute virtualscreen_rotate. For example, in the case where the virtual screen frame image 42 is to be arranged in a direction same as that of the VR frame image 40, 0 is set as the value of the attribute virtualscreen_rotate. On the other hand, for example, in the case where the virtual screen frame image 42 is to be arranged rotated by 90 degrees clockwise with respect to the VR frame image 40, 1 is set as a value of the attribute virtualscreen_rotate. Further, for example, in the case where the virtual screen frame image 42 is to be arranged rotated by 90 degrees counterclockwise with respect to the VR frame image 40, 2 is set as a value of the attribute virtualscreen_rotate.

Further, for example, the division number of the virtual screen frame image 42 is set as a value of the attribute virtualscreen_devided. Here, in the case where the virtual screen frame image 42 is divided into n, n is set as the value of the attribute virtualscreen_devided. It is to be noted that, in the case where the virtual screen frame image 42 is not divided, 1 is set as the value of the attribute virtualscreen_devided.

Further, the arrangement form of the divided virtual screen frame image 42 is set as a value of the attribute virtualscreen_devided_Type. For example, in the case where the divisional images of the divided virtual screen frame image 42 are arranged side by side in the horizontal direction in a synthetic frame image, w is set as a value of the attribute virtualscreen_devided_Type. In this case, by rearranging the virtual screen frame image 42 after division in which the divisional images are arranged side by side horizontally in the synthetic frame image such that the divisional images are arranged vertically, the virtual screen frame image 42 before division is reproduced. On the other hand, in the case where the divisional images of the divided virtual screen frame image 42 are arranged side by side in the vertical direction, 2 is set as a value of the attribute virtualscreen_devided_Type. In this case, by rearranging the virtual screen frame image 42 after division in which the divisional images are arranged side by side vertically in the synthetic frame image such that the divisional images are arranged horizontally, the virtual screen frame image 42 before division is reproduced.

Further, the coordinate value in the horizontal direction of the upper left corner of the virtual screen frame image 42 in the case where, for example, the upper left corner of the synthetic frame image is the origin is set as a value of the attribute left_position_m (1≤m≤n). Further, the coordinate value in the vertical direction of the upper left corner of the virtual screen frame image 42 in the case where the upper left corner of the synthetic frame image is the origin is set as a value of the attribute top_position_m (1≤m≤n). Further, the horizontal length and the vertical length of the virtual screen frame image 42 are set as a value of the attribute x_size_m and a value of the attribute y_size_m (1≤m≤n), respectively. It is to be noted that the value n indicates a division number of the virtual screen frame image 42 as described hereinabove. Meanwhile, the value m indicates an order number of a divisional image when the virtual screen frame image 42 is divided into n. It is to be noted that, in the case where it is determined that the arrangement method for reducing the virtual screen frame image 42 and then arranging the virtual screen frame image 42 in a margin is to be included into the second arrangement method, the size after the reduction may be set as a value of the attribute x_size_m and a value of the attribute y_size_m.

For example, it is assumed that the virtual screen frame image 42 is divided into three as depicted in FIG. 7B. In this case, as depicted in FIG. 9B, for the first divisional image of the divided virtual screen frame image 42, a value of the attribute left_position_1, a value of the attribute top_position_1, a value of the attribute x_size_1, and a value of the attribute y_size_1 are set. Similarly, for the second divisional image of the divided virtual screen frame image 42, a value of the attribute left_position_2, a value of the attribute top_positoin_2, a value of the attribute x_size_2, and a value of the attribute y_size_2 are set. Similarly, for the third divisional image of the divided virtual screen frame image 42, a value of the attribute left_position_3, a value of the attribute top_position_3, a value of the attribute x_size_3, and a value of the attribute y_size_3 are set.

In the present example, the first divisional image, second divisional image and third divisional image of the divided virtual screen frame image 42 are arranged side by side in this order from the left. Further, in this case, the original virtual screen frame image 42 is reproduced by arranging the virtual screen frame image 42 after division such that the divisional image arranged on the left, divisional image arranged in the middle, and divisional image arranged on the right are arranged side by side vertically in this order from above.

Further, the magnitude with which, for example, the virtual screen frame image 42 is superimposed on the VR frame image 40 in the texture image 44 is set as a value of the attribute overlay_size_degree_p. Then, the position in the horizontal direction at which the virtual screen frame image 42 is superimposed on the VR frame image 40 in the texture image 44 is set as a value of the attribute overlay_size_position_x_degree_p. Further, the position in the vertical direction at which the virtual screen frame image 42 is superimposed on the VR frame image 40 in the texture image 44 is set as a value of the attribute overlay_size_position_y_degree_p.

It is to be noted that the value of the attribute overlay_size_degree_p, the value of the attribute overlay_size_position_x_degree_p, and the value of the attribute overlay_size_position_y_degree_p may be represented, for example, by angles. Here, the value p is a number representing an order number of the VR frame image 40. For example, the synthetic frame image sometimes includes a plurality of VR frame images 40. In this case, a value of the attribute overlay_size_degree_p, a value of the attribute overlay_size_position_x_degree_p, and a value of the attribute overlay_size_position_y_degree_p corresponding to each of the VR frame images 40 are set.

In the examples depicted in FIGS. 7A and 7B, the synthetic frame image includes a single VR frame image 40. Therefore, in the manifest files depicted in FIGS. 9A and 9B, a value of the attribute overlay_size_degree_1, a value of the attribute overlay_size_position_x_degree_1, and a value of the attribute overlay_size_position_y_degree_1 are set.

It is to be noted that the values of the attributes indicated by the manifest file may be represented by relative values. For example, as the value of the attribute left_position or the value of the attribute x_size, a ratio of the value to the horizontal length of the synthetic frame image may be represented in terms of percentage. Further, for example, as the value of the attribute top_position or the value of the attribute y_size, a ratio of the value to the vertical length of the synthetic frame image may be represented in terms of percentage.

The manifest file generation section 66 may generate a manifest file in which values of attributes inputted by a person in charge of video delivery are set. Further, for example, the manifest file generation section 66 may generate a manifest file in which values of attributes are set on the basis of meta information associated with a VR frame image 40, a virtual screen frame image 42, or a synthetic frame image.

Further, for example, the manifest file generation section 66 may generate a manifest file in which values of attributes according to arrangement determined by the arrangement determination section 64 are set. Further, the values of the attributes set in this manner may be changeable, for example, by the operation section 12f operated by a person in charge of video delivery.

The manifest file storage section 68 stores, in the present embodiment, for example, data indicative of values of attributes of individual frame images such as, for example, a manifest file generated by the manifest file generation section 66.

The manifest file transmission section 70 transmits, in the present embodiment, for example, data indicative of values of attributes of individual frame images such as a manifest file generated by the manifest file generation section 66. Here, for example, the manifest file may be transmitted to the HMD 20 through the entertainment apparatus 22 and the relay apparatus 24.

The video generation section 72 generates a third image (for example, a synthetic frame image) on the basis of, in the present embodiment, for example, a first image (for example, a VR frame image 40) and a second image (for example, a virtual screen frame image 42). Here, for example, a synthetic frame image may be generated in which a VR frame image 40 is arranged by a first arrangement method indicated by the manifest file and a virtual screen frame image 42 is arranged by a second arrangement method indicated by the manifest file. Here, for example, as depicted in FIGS. 7A and 7B, a synthetic frame image in which a VR frame image 40 and a virtual screen frame image 42 are arranged is generated. Then, in the present embodiment, for example, the video generation section 72 encodes a plurality of synthetic frame images and/or meta information to generate a video of a delivery target.

In the present embodiment, for example, the video transmission section 74 transmits a synthetic frame image in which a VR frame image 40 is arranged by the first arrangement method and a virtual screen frame image 42 is arranged by the second arrangement method. For example, the video transmission section 74 transmits an encoded video of a delivery target generated by the video generation section 72. Here, the video may be transmitted to the HMD 20, for example, through the entertainment apparatus 22 and the relay apparatus 24.

In the present embodiment, for example, the manifest file reception section 80 receives data indicative of values of attributes of individual frame images such as a manifest file transmitted by the manifest file transmission section 70. Then, the manifest file reception section 80 stores the data such as a manifest file indicative of values of attributes of individual frame image into the manifest file storage section 82.

In the present embodiment, for example, the manifest file storage section 82 stores the data indicative of values of attributes of individual frame images such as a manifest file received by the manifest file reception section 80.

In the present embodiment, for example, the video reception section 84 receives a video transmitted from the video transmission section 74.

In the present embodiment, for example, the image extraction section 86 decodes a video transmitted from the video transmission section 74 and extracts a synthetic frame image. Then, in the present embodiment, for example, the image extraction section 86 extracts a VR frame image 40 and a virtual screen frame image 42 on the basis of data such as a manifest file indicative of values of attributes of individual frame images and a synthetic frame image. Here, for example, the image extraction section 86 may extract, on the basis of a first arrangement method and a second arrangement method indicated by the manifest file, a VR frame image 40 and a virtual screen frame image 42 from the synthetic frame image. Further, for example, the image extraction section 86 may rotate the virtual screen frame image 42 after rotation arranged in the synthetic frame image to reproduce the virtual screen frame image 42 before rotation. Alternatively, for example, the direction in which divisional images of the virtual screen frame image 42 after division arranged in a synthetic frame image are lined up may be changed to reproduce the virtual screen frame image 42 before division.

The display controlling operation acceptance section 88 accepts an operation for controlling an image displayed on the display section 20f such as, for example, in the present embodiment, an operation for changing the gaze direction 52 such as an operation of the user turning its head or an operation for switching the texture image 44.

In the present embodiment, for example, the display controlling section 90 generates a texture image 44 based on an operation accepted by the display controlling operation acceptance section 88 and a VR frame image 40 and a virtual screen frame image 42 extracted by the image extraction section 86. Then, the display controlling section 90 controls the display section 20f to display the generated texture image 44.

Here, the display controlling section 90 may cause at least one of an extracted VR frame image 40 and a virtual screen frame image 42 to be displayed.

For example, the display controlling section 90 may retain viewpoint position data indicative of the position of the viewpoint 50, gaze direction data indicative of a gaze direction 52, and a display control flag indicative of whether or not a virtual screen frame image 42 is to be displayed. Here, the value of the viewpoint position data, the value of the gaze direction data, and the value of the display control flag may be set in response to an operation accepted by the display controlling operation acceptance section 88. Then, a texture image 44 according to the value of the display control flag may be arranged in the virtual space 46. Then, an image representative of a state in which a gaze direction 52 indicated by the value of the gaze direction data is viewed from the viewpoint 50 arranged at a position indicated by the value of the viewpoint position data may be displayed on the display section 20f. Here, for example, in the case where the value of the display control flag is 0, the HMD 20 may be controlled such that the virtual screen frame image 42 is not displayed thereon, but in the case where the value of the display control flag is 1, the HMD 20 may be controlled such that the virtual screen frame image 42 is displayed.

For example, in the case where an event held in an event venue is to be live relayed, capturing of a VR frame image 40 by the camera 16a and capturing of a virtual screen frame image 42 by the camera 16b may be performed at a predetermined sampling rate. Then, generation of a synthetic frame image based on the VR frame image 40 and the virtual screen frame image 42 may be performed in accordance with values of attributes represented by a manifest file at the predetermined sampling rate described above. Then, a video in which the synthetic frame image generated at the predetermined sampling rate in this manner and meta information are encoded may be delivered to the user system 14. Then, a video of the live relay of the event venue may be displayed on a real time basis on the display section 20f.

Figure 10A:
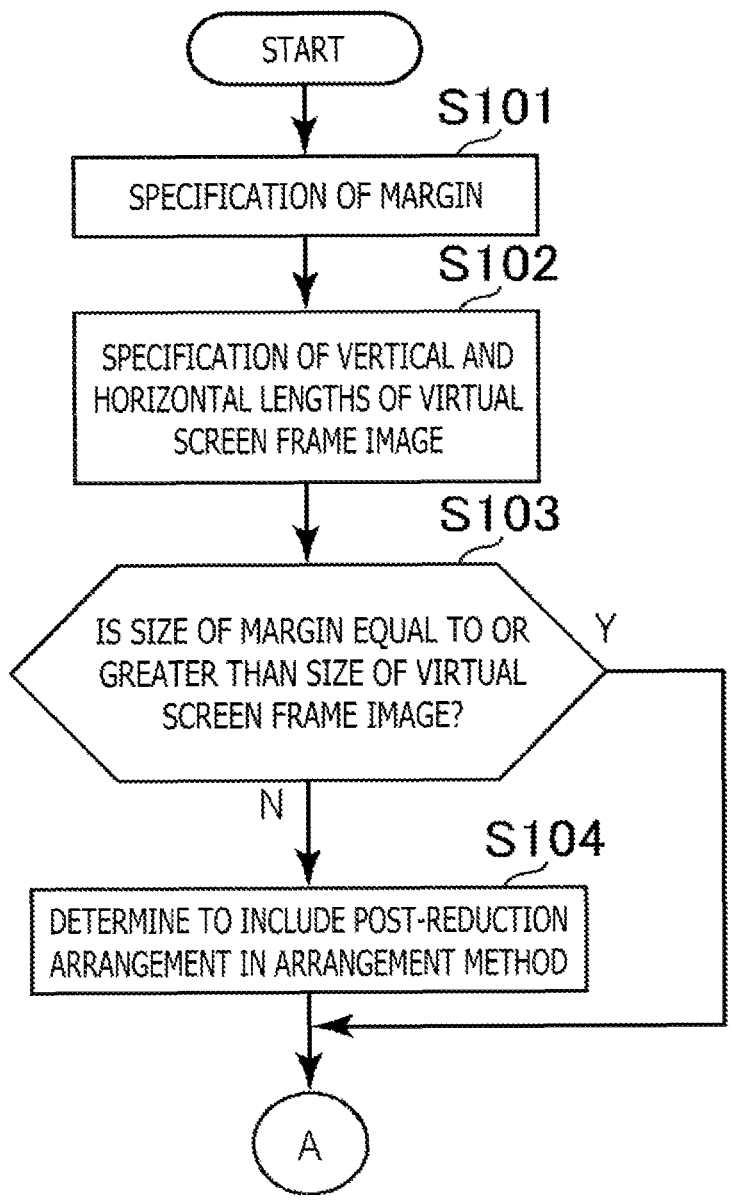
FIG. 10A is a flow chart depicting an example of a flow of processing performed by a video delivery apparatus according to an embodiment of the present invention.
Figure 10C:
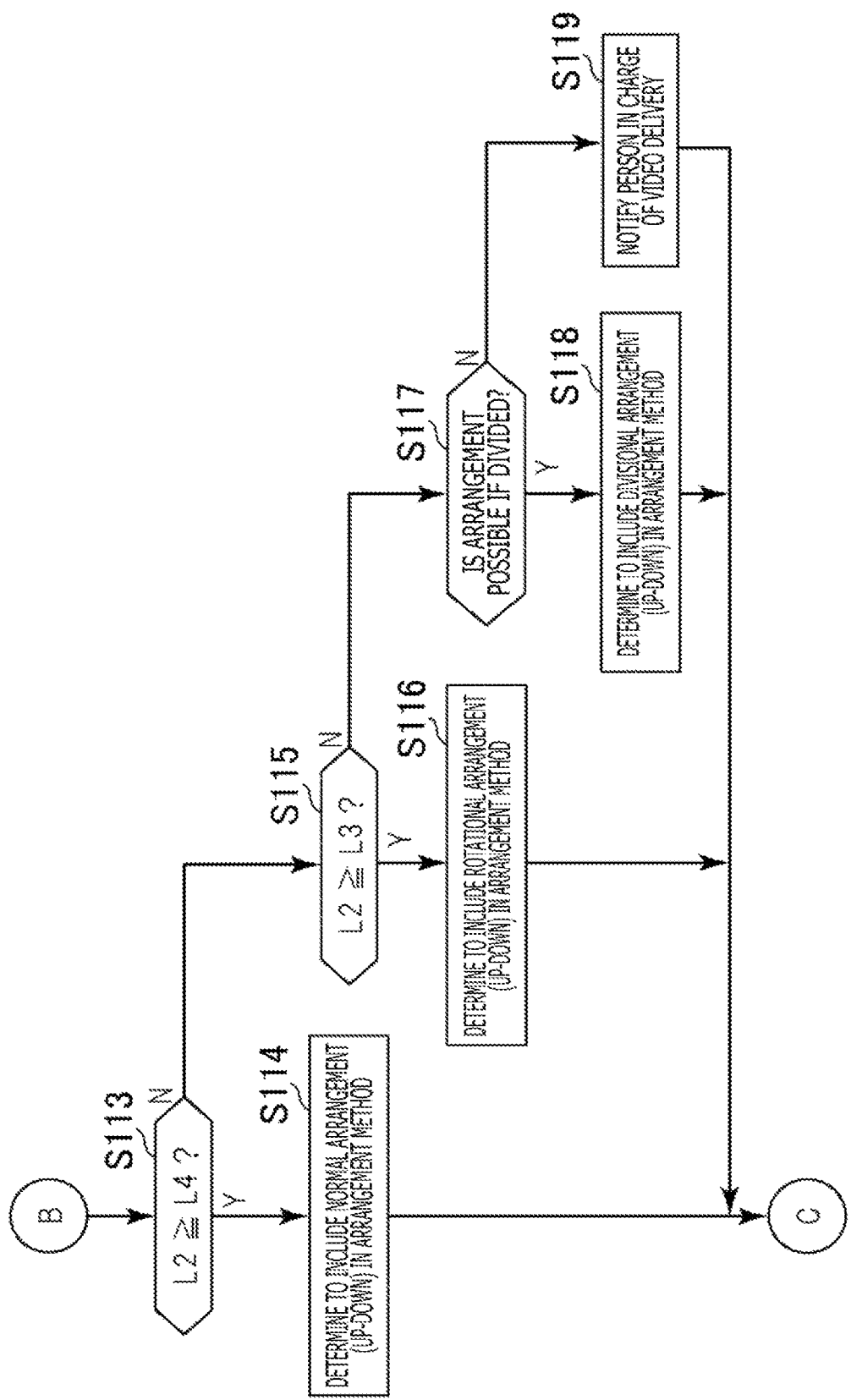
FIG. 10C is a flow chart depicting an example of a flow of processing performed by a video delivery apparatus according to an embodiment of the present invention.

Here, an example of a flow of processing for determining an arrangement method of a virtual screen frame image 42, which is performed by the video delivery apparatus 12 according to the present embodiment, is described with reference to flow charts exemplified in FIGS. 10A to 10C. Note that it is assumed that, in the present example of processing, the vertical and horizontal lengths of a synthetic frame image are determined in advance.

Figure 11:
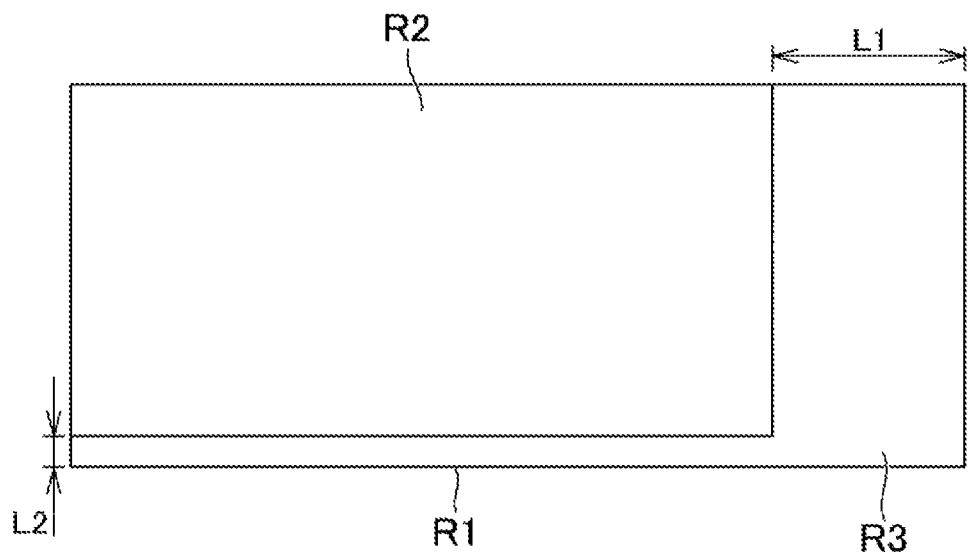
FIG. 11 is a view depicting an example of a region corresponding to a margin when a region corresponding to a virtual reality (VR) frame image is secured in an upper left corner of a region corresponding to a synthetic frame image.

First, the margin specification section 62 specifies a margin when a VR frame image 40 is arranged in the upper left corner of a synthetic frame image (S101). FIG. 11 depicts an example of a region R3 corresponding to a margin when a region R2 corresponding to the VR frame image 40 is secured in the upper left corner of a region R1 corresponding to the synthetic frame image. Here, as depicted in FIG. 11, the horizontal length of a narrow portion in the region R3 having an inverted L shape is represented by L1, and the vertical length of the narrow portion is represented by L2.

Then, the arrangement determination section 64 specifies the vertical and horizontal lengths of the virtual screen frame image 42 acquired by the captured image acquisition section 60 (S102).

Then, the arrangement determination section 64 decides whether or not the size of the margin specified by the process indicated at S101 is equal to or greater than the size of the virtual screen frame image 42 whose vertical and horizontal lengths are specified by the process indicated at 3102 (S103).

In the case where it is decided that the size of the margin is not equal to or greater than the size of the virtual screen frame image 42 (S103: N), the arrangement determination section 64 decides that an arrangement method of reducing the virtual screen frame image 42 and arranging the reduced virtual screen frame image 42 in the margin (post-reduction arrangement) is to be included in the arrangement method for the virtual screen frame image 42 (S104). Here, for example, an arrangement method of reducing the virtual screen frame image 42 such that the size of the virtual screen frame image 42 becomes same as the size of the margin and then arranging the reduced virtual screen frame image 42 in the margin may be determined to be included in the arrangement method for the virtual screen frame image 42. In this case, a manifest file indicating the size of the virtual screen frame image 42 after reduced is generated.

Figure 12:
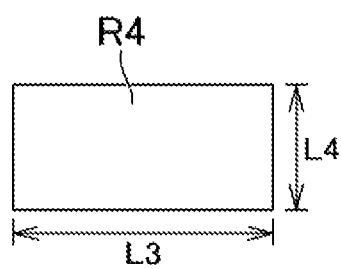
FIG. 12 is a view depicting an example of a region corresponding to a virtual screen frame image.

FIG. 12 depicts a region R4 corresponding to the virtual screen frame image 42. Thus, in the following description, the horizontal length of the virtual screen frame image 42 is represented by L3 and the vertical length of the virtual screen frame image 42 is represented by L4 as depicted in FIG. 12. It is to be noted that, in the case where it is decided by the process indicated at S104 that the method of reducing and arranging is to be included in the arrangement method for the virtual screen frame image 42, the horizontal length of the virtual screen frame image 42 after reduced is represented by L3 and the vertical length is represented by L4.

In the case where it is decided by the process indicated at S103 that the size of the margin is equal to or greater than the size of the virtual screen frame image 42 (S103: Y) or in the case where the process indicated at S104 ends, the arrangement determination section 64 decides whether or not the length L1 is equal to or greater than the length L2 (Sl05). Here, that the length L1 is equal to or greater than the length L2 is equivalent to that a right portion with respect to the VR frame image 40 has more room than a lower portion with respect to the VR frame image 40. Conversely, that the length L1 is smaller than the length L2 is equivalent to that a lower portion with respect to the VR frame image 40 has more room than a right portion with respect to the VR frame image 40.

In the case where it is decided that the length L is equal to or greater than the length L2 (S105: Y), the arrangement determination section 64 decides whether or not the length L1 is equal to or greater than the length L3 (S106). That the length LU is equal to or greater than the length L3 is equivalent to that a virtual screen frame image 42 can be arranged in the same direction as that of the VR frame image 40 in a right portion with respect to the VR frame image 40. Conversely, that the length L1 is not equal to or greater than the length 13 signifies that, in the case where the virtual screen frame image 42 is disposed side by side in the same direction as that of the VR frame image 40 in the margin, the virtual screen frame image 42 protrudes from the margin.

It is assumed here that it is decided that the length L1 is equal to or greater than the length L3 (S106: Y). In this case, the arrangement determination section 64 decides that to arrange the virtual screen frame image 42 in a direction same as that of the VR frame image 40 in the right portion with respect to the VR frame image 40 (normal arrangement (left-right)) is to be included in the arrangement method for the virtual screen frame image 42 (S107). Then, the processing indicated by the present example of processing is ended. In this case, a manifest file indicating that divisional images of the virtual screen frame image 42 are arranged side by side horizontally in a direction same as that of the VR frame image 40 is generated.

In the case where it is decided by the process indicated at S106 that the length L1 is smaller than the length L3 (S106: N), the arrangement determination section 64 decides whether or not the length L1 is equal to or greater than the length L4 (S108). That the length L1 is equal to or greater than the length L4 is equivalent to that it is possible to arrange the virtual screen frame image 42 in a direction different from that of the VR frame image 40 in the margin.

It is assumed here that the length L1 is equal to or greater than the length L4 (S108: Y). In this case, the arrangement determination section 64 decides that to arrange the virtual screen frame image 42 in a direction different from that of the VR frame image 40 in the margin is to be included in the arrangement method for the virtual screen frame image 42 (S109). Here, for example, it is determined that to arrange the virtual screen frame image 42 in a direction rotated by 90 degrees with respect to the VR frame image 40 in the right portion with respect to the VR frame image 40 (rotational arrangement (left-right)) is to be included in the arrangement method for the virtual screen frame image 42. Then, the processing indicated by the present example of processing is ended. It is to be noted that, it may be determined that the virtual screen frame image 42 is to be arranged in a direction rotated by 90 degrees clockwise with respect to the VR frame image 40, or it may be determined that the virtual screen frame image 42 is to be arranged in a direction rotated by 90 degrees counterclockwise. In this case, a manifest file indicating that divisional images of the virtual screen frame image 42 are arranged side by side horizontally in a direction different from that of the VR frame image 40 is generated.

In the case where it is decided in the process indicated at S108 that the length L1 is smaller than the length L4 (S108: N), the arrangement determination section 64 decides whether or not it is possible to arrange the virtual screen frame image 42 in the margin by changing the direction in which the divisional images of the virtual screen frame image 42 are lined up (S110). Here, for example, it may be confirmed whether or not it is possible to place the virtual screen frame image 42 in the margin by changing the direction in which, where the virtual screen frame image 42 is divided vertically into n, the n divisional images of the virtual screen frame image 42 are lined up from the horizontal direction to the vertical direction successively changing the integer n in order from 1 to a predetermined number N. Then, in the case where it is confirmed that the virtual screen frame image 42 fits in the margin at a certain integer n, it may be decided that the virtual screen frame image 42 can be arranged if it is divided. On the other hand, in the case where it is decided that the virtual screen frame image 42 does not fit in the margin at any integer n from 1 to the predetermined number N, it may be decided that the virtual screen frame image 42 cannot be arranged even if it is divided.

It is assumed that it is possible to arrange the virtual screen frame image 42 in the margin by changing the lined up direction of the divisional images of the virtual screen frame image 42 (S110: Y). In this case, the arrangement determination section 64 determines that to arrange the virtual screen frame image 42 in the margin by changing the lined up direction of the divisional images of the virtual screen frame image 42 is to be included in the arrangement method for the virtual screen frame image 42 (S111). Here, for example, it is decided that to change the direction in which, where the virtual screen frame image 42 is divided into n vertically, the n divisional images are lined up from the horizontal direction to the vertical direction and arrange the n divisional images on the right with respect to the VR frame image 40 (divisional arrangement (left-right)) is to be included in the arrangement method for the virtual screen frame image 42. Then, the processing indicated by the present example of processing is ended. In this case, a manifest file indicating that the divisional images of the virtual screen frame image 42, which are arranged side by side vertically, are arranged on the right with respect to the VR frame image 40 is generated.

On the other hand, it is assumed that it is not possible to arrange the virtual screen frame image 42 in the margin even if the lined up direction of the divisional images of the virtual screen frame image 42 is changed (S110: N). In this case, the arrangement determination section 64 performs notification of suggesting a person in charge of video delivery to determine an arrangement method (S112). Here, the notification to a person in charge of video delivery may be performed, for example, by display outputting or sound outputting. Then, the processing indicated by the present example of processing is ended. In this case, for example, it is sufficient if a value of an attribute representative of the arrangement method for the virtual screen frame image 42 is set in the manifest file by operation of the operation section 12*f* by a person in charge of video delivery.

In the case where it is decided by the process indicated at S105 that the length L1 is smaller than the length L2 (S105: N), the arrangement determination section 64 decides whether or not the length L2 is equal to or greater than the length L4 (S113). That the length L2 is equal to or greater than the length L4 is equivalent to that the virtual screen frame image 42 can be arranged in a direction same as that of the VR frame image 40 under the VR frame image 40. Conversely, that the length L2 is not equal to or greater than the length L4 is equivalent to that, when the divisional images of the virtual screen frame image 42 are arranged lined up in a direction same as that of the VR frame image 40 in the margin, the virtual screen frame image 42 protrudes from the margin.

Here, it is assumed that the length L2 is equal to or greater than the length L4 (S113: Y). In this case, the arrangement determination section 64 determines that to arrange the virtual screen frame image 42 in a direction same as that of the VR frame image 40 under the VR frame image 40 (normal arrangement (up-down)) is to be included in the arrangement method for the virtual screen frame image 42 (S114). Then, the processing indicated by the present example of processing is ended. In this case, a manifest file in which the divisional images of the virtual screen frame image 42 are arranged lined up horizontally in a direction same as that of the VR frame image 40 is generated.

In the case where it is decided by the process indicated at S113 that the length L2 is smaller than the length L4 (S113: N), the arrangement determination section 64 decides whether or not the length L2 is equal to or greater than the length L3 (S115). That the length L2 is equal to or greater than the length L3 is equivalent to that it is possible to arrange the virtual screen frame image 42 in a direction different from that of the VR frame image 40 in the margin.

Here, it is assumed that the length L2 is equal to or greater than the length L3 (S115: Y). In this case, the arrangement determination section 64 determines that to arrange the virtual screen frame image 42 in a direction different from that of the VR frame image 40 in the margin is to be included in the arrangement method for the virtual screen frame image 42 (S116). Here, for example, it is determined that to arrange the virtual screen frame image 42 in a direction rotated by 90 degrees with respect to the VR frame image 40 under the VR frame image 40 (rotational arrangement (up-down)) is to be included in the arrangement method for the virtual screen frame image 42. Then, the processing indicated by the present example of processing is ended. It is to be noted that, it may be determined that the virtual screen frame image 42 is to be arranged in a direction rotated by 90 degrees clockwise with respect to the VR frame image 40, or it may be determined that the virtual screen frame image 42 is to be arranged in a direction rotated by 90 degrees counterclockwise. In this case, a manifest file is generated in which it is indicated that the divisional images of the virtual screen frame image 42 are arranged lined up vertically in a direction different from that of the VR frame image 40.

In the case where it is decided by the process indicated at S115 that the length L2 is smaller than the length L3 (S115: N), the arrangement determination section 64 decides whether or not it is possible to arrange the virtual screen frame image 42 in the margin by changing the direction in which the divisional images of the divided virtual screen frame image 42 are lined up (S117). Here, for example, it may be confirmed whether or not it is possible to place the virtual screen frame image 42 in the margin by changing the direction in which, where the virtual screen frame image 42 is divided horizontally into n, the n divisional images of the virtual screen frame image 42 are lined up from the vertical direction to the horizontal direction successively changing the integer n in order from 1 to a predetermined number N. Then, in the case where it is confirmed that the virtual screen frame image 42 fits in the margin at a certain integer n, it may be decided that the virtual screen frame image 42 can be arranged if it is divided. On the other hand, in the case where it is decided that the virtual screen frame image 42 does not fit in the margin at any integer n from 1 to the predetermined number N, it may be decided that the virtual screen frame image 42 cannot be arranged even if it is divided.

It is assumed that it is possible to arrange the virtual screen frame image 42 in the margin by changing the lined up direction of the divisional images of the virtual screen frame image 42 (S117: Y). In this case, the arrangement determination section 64 determines that to arrange the virtual screen frame image 42 in the margin by changing the lined up direction of the divisional images of the virtual screen frame image 42 is to be included in the arrangement method for the virtual screen frame image 42 (S118). Here, for example, it is decided that to change the direction in which, where the virtual screen frame image 42 is divided into n horizontally, the n divisional images are lined up from the vertical direction to the horizontal direction and arrange the n divisional images under the VR frame image 40 (divisional arrangement (up-down)) is to be included in the arrangement method for the virtual screen frame image 42.

Then, the processing indicated by the present example of processing is ended. In this case, a manifest file indicating that the divisional images of the virtual screen frame image 42, which are arranged side by side horizontally, are arranged under the VR frame image 40 is generated.

On the other hand, it is assumed that it is not possible to arrange the virtual screen frame image 42 in the margin even if the lined up direction of the divisional images of the virtual screen frame image 42 is changed (S117: N). In this case, the arrangement determination section 64 performs notification of suggesting a person in charge of video delivery to determine an arrangement method (S119). Then, the processing indicated by the present example of processing is ended. In this case, for example, it is sufficient if a value of an attribute representative of the arrangement method for the virtual screen frame image 42 is set in the manifest file by operation of the operation section 12f by a person in charge of video delivery.

For example, it is assumed that the horizontal length of the synthetic frame image is 3840 pixels and the vertical length is 1920 pixels. Further, it is assumed that the horizontal length of the VR frame image 40 is 2760 pixels and the vertical length is 1920 pixels. Further, it is assumed that the horizontal length of the virtual screen frame image 42 is 1920 pixels and the vertical length is 1080 pixels.

In this case, the size of the margin is 2073600 square pixels and is equal to the size of the virtual screen frame image 42 (S103: Y).

Then, in this case, the length L1 is 1080 pixels and the length L2 is 0 pixel. Further, the length L3 is 1920 pixels and the length L4 is 1080 pixels.

In the present example, the length L1 is equal to or greater than the length L2 (S105: Y); the length L1 is smaller than the length L3 (S105: N); and the length L1 is equal to or greater than the length L4 (S108: Y). Therefore, it is determined that to arrange the virtual screen frame image 42 in a direction rotated by 90 degrees with respect to the VR frame image 40 on the right with respect to the VR frame image 40 (rotational arrangement (left-right)) is to be included in the arrangement method for the virtual screen frame image 42 (S110).

Further, it is assumed that, for example, the horizontal length of the synthetic frame image is 3840 pixels and the vertical length is 2160 pixels. Then, it is assumed that the horizontal length of the VR frame image 40 is 3840 pixels and the vertical length is 1920 pixels. Further, it is assumed that the horizontal length of the virtual screen frame image 42 is 1920 pixels and the vertical length is 1080 pixels.

In this case, the size of the margin is 921600 square pixels and is smaller than the size of the virtual screen frame image 42 (S103: N). Therefore, in this case, it is determined that the post-reduction arrangement is to be included in the arrangement method for the virtual screen frame image 42 (S104). Here, for example, it may be determined that to reduce the size of the virtual screen frame image 42 so as to be same as the size of the margin without changing the aspect ratio is to be included in the arrangement method for the virtual screen frame image 42. For example, it may be determined that to reduce the horizontal length of the virtual screen frame image 42 to 1280 pixels and reduce the vertical length to 720 pixels is to be included in the arrangement method for the virtual screen frame image 42.

In this case, the length L1 is 0 pixel, and the length L2 is 240 pixels. Further, the length L3 is 1280 pixels, and the length L4 is 720 pixels.

In the present example, the length L1 is smaller than the length L2 (S105: N); the length L2 is smaller than the length L4 (S112: N); and the length L2 is smaller than the length L3 (S114: N). Then, in this case, if the virtual screen frame image 42 is divided into three in the horizontal direction and the three divisional images are arranged side by side horizontally, then they fit in the margin (S115: Y). Therefore, it is determined that the divisional arrangement (up-down) is to be included in the arrangement method for the virtual screen frame image 42 (S116).

It is to be noted that, in the foregoing description, the timing at which a manifest file is to be generated does not matter in particular. For example, generation and transmission of a manifest file may be performed before live relay is started, or, for example, data indicative of values of attributes of individual frame images may be transmitted in association with the synthetic frame image from the video delivery apparatus 12 to the user system 14. For example, if this is done, then even during live relay, values of attributes of individual frame images can be changed smoothly.

Figure 13:
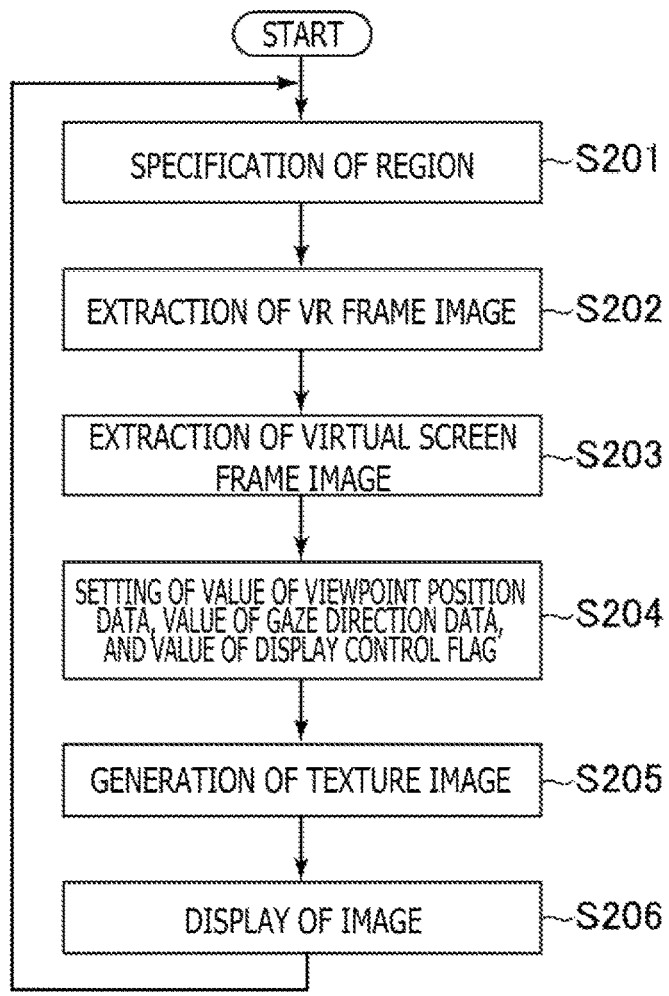
FIG. 13 is a flow chart depicting an example of a flow of processing performed in a head mounted display according to an embodiment of the present invention.

Now, an example of a flow of processing performed by the HMD 20 according to the present embodiment for causing an image extracted from a decoded synthetic frame image to be displayed is described with reference to a flow chart exemplified in FIG. 13.

First, the image extraction section 86 specifies a region occupied by the VR frame image 40 and a region occupied by the virtual screen frame image 42 in a decoded synthetic frame image (S201). Here, for example, the regions mentioned may be specified on the basis of values of attributes indicated by the manifest file stored in the manifest file storage section 82.

Then, the image extraction section 86 extracts the VR frame image 40 arranged in the region occupied by the VR frame image 40 and specified by the process indicated at S201 (S202).

Then, the image extraction section 86 extracts the virtual screen frame image 42 arranged in the region occupied by the virtual screen frame image 42 and specified by the process indicated at S201 (S203). Here, for example, it is sometimes indicated in the manifest file that the virtual screen frame image 42 is arranged rotated. In this case, a process for reproducing the virtual screen frame image 42 before rotation by rotating the virtual screen frame image 42 after rotation is performed by the process indicated at S203. Further, for example, it is sometimes indicated in the manifest file that the virtual screen frame image 42 is arranged divided. In this case, by the process indicated at S203, a process of reproducing the virtual screen frame image 42 before division by re-arranging the divisional images of the virtual screen frame image 42 after division is performed.

Then, the display controlling section 90 sets a value of the viewpoint position data, a value of the gaze direction data, and a value of the display control flag retained therein on the basis of an operation accepted by the display controlling operation acceptance section 88 in a loop in the current operation cycle (S204). Here, for example, when a predetermined operation for the controller 30 is accepted, the value of the display control flag may be updated from 1 to 0 or from 0 to 1.

Then, the display controlling section 90 generates and maps a texture image 44 to the inner side of the background object 48 (S205). Here, the texture image 44 is generated, for example, on the basis of the VR frame image 40 extracted by the process indicated at S202, the virtual screen frame image 42 extracted by the process indicated at S203, and the value of the display control flag set by the process indicated at S204. Here, for example, a position or a size of the virtual screen frame image 42 with respect to the VR frame image 40 may be determined, for example, on the basis of values of attributes indicated by the manifest file. Then, a texture image 44 in which the virtual screen frame image 42 is arranged at the determined position and in the determined size may be generated.

Figure 5B:
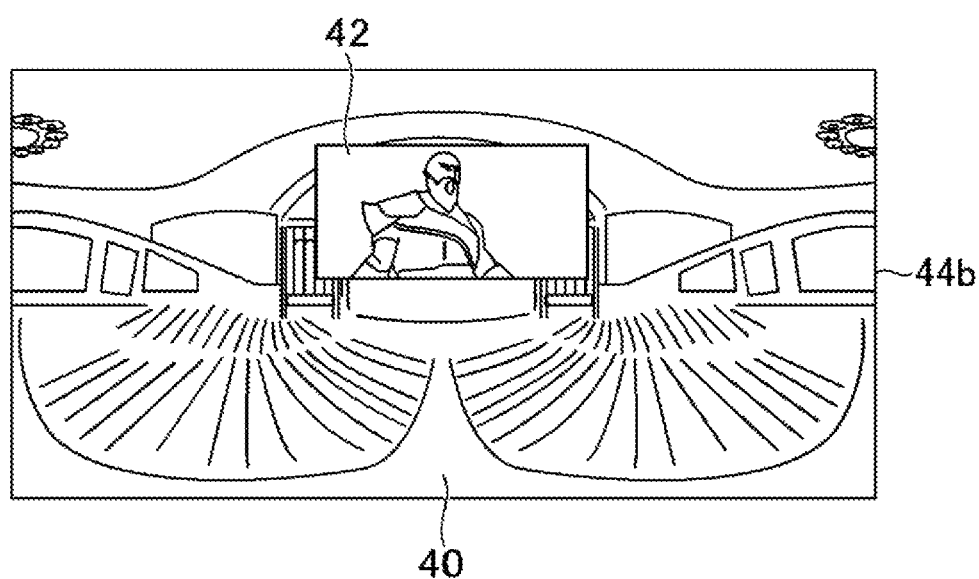
FIG. 5B is a view depicting an example of a texture image.

Further, for example, in the case where the value of the display control flag is 0, such a texture image 44a that does not include the virtual screen frame image 42 as depicted in FIG. 5A may be generated. On the other hand, for example, in the case where the value of the display control flag is 1, such a texture image 44b in which the virtual screen frame image 42 is arranged superimposed on the VR frame image 40 as depicted in FIG. 5B may be generated. In this case, the virtual screen frame image 42 may be arranged superimposed on the VR frame image 40 after it is deformed so as to be displayed as a rectangular image on the display section 20f as described hereinabove. Further, the virtual screen frame image 42 may be mapped as a texture image 44b on a plate-shaped virtual object disposed in the virtual space 46 as described hereinabove. In this manner, the virtual screen frame image 42 may be arranged as the texture image 44b independent of the VR frame image 40 in the virtual space 46.

Then, the display controlling section 90 controls the display section 20f to display an image representative of a state in which a gaze direction 52 indicated by a value of the gaze direction data set by the process indicated at S204 is viewed from a viewpoint 50 arranged at a position indicated by the value of the viewpoint position data set by the process indicated at S204 (S206).

Then, the processing returns to the process indicated at S201, and the processes beginning with S201 are executed for a synthetic frame image of a next frame.

It is to be noted that the arrangement method of the VR frame image 40 and the virtual screen frame image 42 is not limited to those described above.

Figure 14:
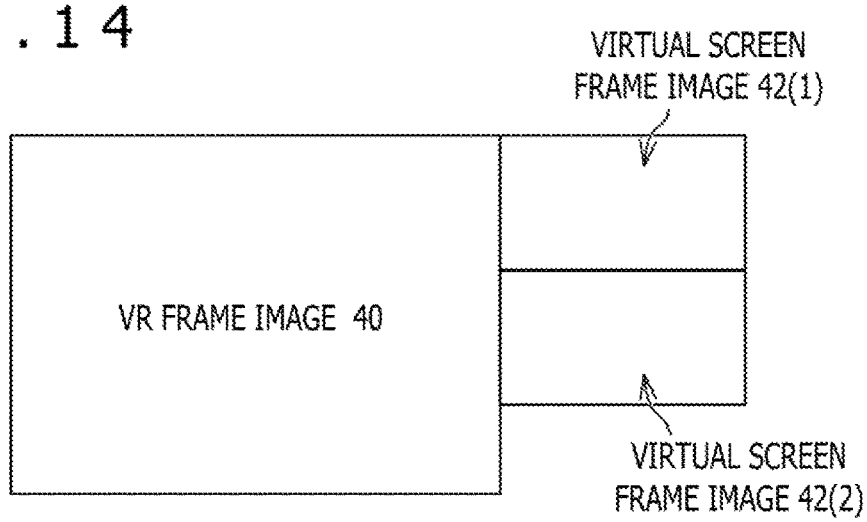
FIG. 14 is a view depicting an example of an arrangement method of an image.

For example, FIG. 14 depicts an example of arrangement in which two images of a virtual screen frame image 42(1) and another virtual screen frame image 42(2) are arranged side by side vertically on the right with respect to the VR frame image 40. Further, FIG. 15 depicts a manifest file corresponding to FIG. 14. In the manifest file depicted in FIG. 15, values of attributes of the VR frame image 40 are indicated in lines from a line next to [VR_Movie_1] to a line preceding to [VirtualScreen_1]. Further, values of attributes of the virtual screen frame image 42(1) are indicated in lines from a line next to [VirtualScreen_1] to a line preceding to [VirtualScreen_2]. Furthermore, values of attributes of the virtual screen frame image 42(2) are indicated in lines from a line next to [VirtualScreen_2].

Figure 16:
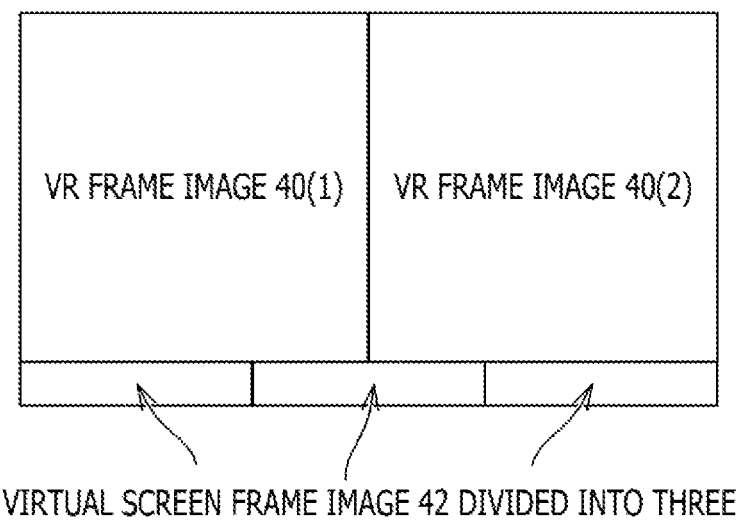
FIG. 16 is a view depicting an example of an arrangement method of an image.

Further, for example, FIG. 16 depicts an example of arrangement in which divisional images of the virtual screen frame image 42 divided into three are arranged side by side horizontally under a VR frame image 40(1) and another VR frame image 40(2) arranged side by side horizontally. Further, FIG. 17 depicts a manifest file corresponding to FIG. 16. In the manifest file depicted in FIG. 17, values of attributes of the VR frame image 40(1) are indicated in lines from a line next to [VR_Movie_1] to a line preceding to [VR_Movie_2]. Further, values of attributes of the VR frame image 40(2) are indicated in lines from a line next to [VR_Movie_2] to a line preceding to [VirtualScreen_1].

Further, values of attributes of the virtual screen frame image 42 are indicated from a line next to [VirtualScreen_1].

As depicted in FIGS. 14 and 16, a synthetic frame image may be generated by synthesizing individual frame images captured by three or more cameras 16. For example, each of two cameras 16 may individually generate a VR frame image 40. In this case, it may be switchable whether the VR frame image 40(1) is to be displayed or the VR frame image 40(2) is to be displayed, for example, by the controller 30 operated by the user. Further, for example, each of two cameras 16 may individually generate a virtual screen frame image 42. In this case, it may be switchable whether the virtual screen frame image 42(1) is to be displayed or the virtual screen frame image 42(2) is to be displayed, for example, by the controller 30 operated by the user.

Figure 18:
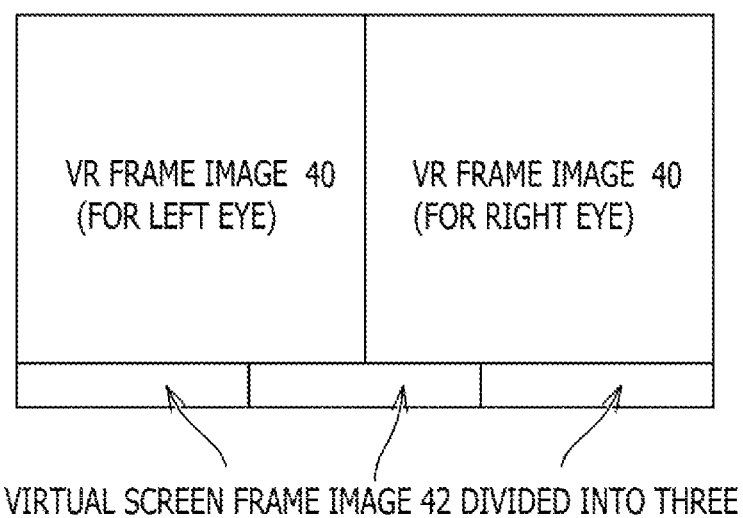
FIG. 18 is a view depicting an example of an arrangement method of an image.

Further, for example, in FIG. 18, an example of arrangement is depicted in which divisional images of the virtual screen frame image 42 divided into three are arranged side by side horizontally under a VR frame image 40 (for the left eye) and another VR frame image 40 (for the right eye), which form a three-dimensional image. In the example of FIG. 18, the VR frame image 40 that is a three-dimensional image is arranged in the side by side form. Further, FIG. 19 depicts a manifest file corresponding to FIG. 18. In the manifest file depicted in FIG. 19, values of attributes of the VR frame image 40 (for the left eye) and the VR frame image 40 (for the right eye) are indicated in lines from a line next to [VR_Movie_1] to a line preceding to [VirtualScreen_1]. Further, values of attributes of the virtual screen frame image 42 are indicated in lines from a line next to [VirtualScreen_1].

A three-dimensional image may be used as the VR frame image 40 as depicted in FIG. 18. In this case, for example, the camera 16*a* may be a stereo camera.

It is to be noted that the manifest file may include a uniform resource locator (URL) of a video of a delivery target. Further, for example, when the user executes a video displaying application installed in the user system 14, the user system 14 may access the URL included in the manifest file. Then, through the access to the URL in this manner, a video may be delivered from the video delivery apparatus 12 to the user system 14.

It is to be noted that the present invention is not limited to the embodiment described above.

For example, the user system 14 is not limited, for example, to that depicted in FIG. 3 and may be, for example, a personal computer or the like.

Further, the particular character strings and numerical values described above and the particular character strings and numerical values in the drawings are exemplary and the present invention is not restricted to such character strings or numerical values.

The invention claimed is:

1. An image arrangement determination apparatus comprising:
 an acquisition section configured to acquire a plurality of images including a first image and a second image having an aspect ratio different from that of the first image;
 a margin specification section configured to specify a margin when the first image is arranged by a given first arrangement method in a region occupied by a third image that is a delivery target; and
 an arrangement determination section configured to determine if a size of the margin is equal to or greater than a size of the second image,
 wherein, if the size of the margin is greater than the size of the second image, the arrangement determination section arranges the second image in the margin adjacent the first image without dividing the second image, and
 wherein, if the size of the margin is less than the size of the second image, the arrangement determination section divides the second image into a plurality of divisional images and determines a second arrangement method from a plurality of second arrangement methods by which the plurality of divisional images are arranged in the margin of the third image adjacent the first image based on a shape of the margin and a shape of the second image.

2. The image arrangement determination apparatus according to claim 1, further comprising:
 a transmission section configured to transmit the third image in which the first image is arranged by the first arrangement method and the second image or plurality of divisional images are arranged by the second arrangement method.

3. The image arrangement determination apparatus according to claim 1, wherein when the size of the margin is greater than the size of the second image, and,
 in a case in which it is decided that, when the second image is arranged lined up with the first image in a same direction as that of the first image in the margin, the second image protrudes from the margin, the determination section rotates the second image before arranging the second image in the margin adjacent the first.

4. A display controlling apparatus comprising:
 an image reception section configured to receive a third image that includes a first region occupied by a first image and a second region occupied by a plurality of divisional images,
 wherein the plurality of divisional images form a second image when combined, the second image having an aspect ratio different from that of the first image;
 a data reception section configured to receive data indicative of a first arrangement method that is an arrangement method of the first image in the third image and a second image arrangement method that is an arrangement method of the plurality of divisional images in the third image;
 an extraction section configured to extract the first image and the plurality of divisional images from the third image based on the first arrangement method and the second arrangement method indicated by the data and to combine the plurality of divisional images to form the second image; and
 a display controlling section configured to cause at least one of the first image and the second image extracted to be displayed.

5. An image arrangement determination method comprising:
 acquiring a plurality of images including a first image and a second image having an aspect ratio different from that of the first image;
 specifying a margin when the first image is arranged by a given first arrangement method in a region occupied by a third image that is a delivery target;
 determining if a size of the margin is equal to or greater than a size of the second image, wherein, if the size of the margin is greater than the size of the second image, arranging the second image in the margin adjacent the first image without dividing the second image, and wherein, if the margin has a size smaller than a size of the second image, determining an arrangement method by which the second image is reduced in size and then subsequently arranged in the margin as the second arrangement method.

6. A display controlling method comprising:

receiving a third image that includes a first region occupied by a plurality of divisional images, wherein the plurality of divisional images form a second image when combined;

receiving data indicative of a first arrangement method that is an arrangement method of the first image in the third image and a second image arrangement method that is an arrangement method of the plurality of divisional images in the third image;

extracting the first image and the plurality of divisional images from the third image based on the first arrangement method and the second arrangement method indicated by the data;

combining the plurality of divisional images to form the second image; and displaying the first image and the second image.

* * * * *